(12) United States Patent
Sasai et al.

(10) Patent No.: US 11,330,292 B2
(45) Date of Patent: *May 10, 2022

(54) IMAGE CODING METHOD FOR ENCODING A DIFFERENCE MOTION VECTOR INTO AND DECODING A DIFFERENCE MOTION VECTOR FROM A BITSTREAM

(71) Applicant: Velos Media, LLC, Plano, TX (US)

(72) Inventors: Hisao Sasai, Osaka (JP); Takahiro Nishi, Nara (JP); Youji Shibahara, Tokyo (JP); Toshiyasu Sugio, Osaka (JP); Kyoko Tanikawa, Osaka (JP); Toru Matsunobu, Osaka (JP)

(73) Assignee: Velos Media, LLC, Dallas, TX (US)

(*) Notice: Subject to any disclaimer, the term of this patent is extended or adjusted under 35 U.S.C. 154(b) by 310 days.

This patent is subject to a terminal disclaimer.

(21) Appl. No.: 16/524,155

(22) Filed: Jul. 28, 2019

(65) Prior Publication Data

US 2019/0349600 A1    Nov. 14, 2019

Related U.S. Application Data

(60) Continuation of application No. 15/498,840, filed on Apr. 27, 2017, now Pat. No. 10,382,779, which is a
(Continued)

(51) Int. Cl.
*H04N 19/513* (2014.01)
*H04N 19/70* (2014.01)
(Continued)

(52) U.S. Cl.
CPC ........... *H04N 19/521* (2014.11); *H04N 19/13* (2014.11); *H04N 19/1887* (2014.11);
(Continued)

(58) Field of Classification Search
CPC .. H04N 19/521; H04N 19/13; H04N 19/1887; H04N 19/436; H04N 19/46;
(Continued)

(56) References Cited

U.S. PATENT DOCUMENTS 5,381,145 A    1/1995    Allen et al.
8,782,379 B2   7/2014    Liu et al.
(Continued)

FOREIGN PATENT DOCUMENTS

GB         2319689 A      5/1998
JP       2008211697 A     9/2008
(Continued)

OTHER PUBLICATIONS

Bross, Benjamin, et al., "High Efficiency Video Coding (HEVC) Text Specification Draft 6", Joint Collaborative Team on Video Coding (JCT-VC) of ITU-T SG16 WP3 and ISO/IEC JTC1/SC29/WG11, Document: JCTVC-H1003, 8th Meeting: San Jose, CA, Feb. 1-10, 2012.
(Continued)

*Primary Examiner* — Clifford Hilaire
*Assistant Examiner* — Kristin Dobbs
(74) *Attorney, Agent, or Firm* — Spencer C. Patterson; Grable Martin Fulton PLLC

(57) ABSTRACT

An image coding method includes coding a motion vector difference indicating a difference between the motion vector and a predicted motion vector, wherein the coding includes: coding a first portion that is a part of a first component which is one of a horizontal component and a vertical component of the motion vector difference; coding a second portion that is a part of a second component which is different from the first component and is the other one of the horizontal component and the vertical component; coding a third portion that is a part of the first component and is different
(Continued)

from the first portion; coding a fourth portion that is a part of the second component and is different from the second portion; and generating a code string which includes the first portion, the second portion, the third portion, and the fourth portion in the stated order.

16 Claims, 34 Drawing Sheets

Related U.S. Application Data continuation of application No. 14/041,043, filed on Sep. 30, 2013, now Pat. No. 9,681,130, which is a division of application No. 13/529,384, filed on Jun. 21, 2012, now Pat. No. 8,855,207.

(60) Provisional application No. 61/500,805, filed on Jun. 24, 2011.

(51) Int. Cl.
| | |
|---|---|
| *H04N 19/13* | (2014.01) |
| *H04N 19/436* | (2014.01) |
| *H04N 19/169* | (2014.01) |
| *H04N 19/463* | (2014.01) |
| *H04N 19/91* | (2014.01) |
| *H04N 19/52* | (2014.01) |
| *H04N 19/46* | (2014.01) |
| *H04N 19/17* | (2014.01) |
| *H04N 19/184* | (2014.01) |

(52) U.S. Cl.
CPC ........... *H04N 19/436* (2014.11); *H04N 19/46* (2014.11); *H04N 19/463* (2014.11); *H04N 19/52* (2014.11); *H04N 19/70* (2014.11); *H04N 19/91* (2014.11); *H04N 19/17* (2014.11); *H04N 19/184* (2014.11)

(58) Field of Classification Search
CPC ...... H04N 19/463; H04N 19/52; H04N 19/70; H04N 19/91; H04N 19/17; H04N 19/184
USPC .................................................... 375/240.16
See application file for complete search history.

(56) References Cited

U.S. PATENT DOCUMENTS

| | | | |
|---|---|---|---|
| 2009/0089549 | A1 | 4/2009 | Liu et al. |
| 2010/0278237 | A1 | 11/2010 | Yeh |
| 2010/0303147 | A1 | 12/2010 | Miyazaki |
| 2011/0080954 | A1 | 4/2011 | Bossen et al. |
| 2012/0014454 | A1 | 1/2012 | Budagavi et al. |
| 2012/0045141 | A1 | 2/2012 | Suzuki et al. |
| 2013/0058407 | A1 | 3/2013 | Rojals et al. |

FOREIGN PATENT DOCUMENTS

| | | |
|---|---|---|
| JP | 2010278668 A | 12/2010 |
| TW | 200931818 A | 7/2009 |
| TW | 201038081 A | 10/2010 |
| WO | 2010028967 A1 | 3/2010 |
| WO | 2011034148 A1 | 3/2011 |
| WO | 2012172113 A1 | 12/2012 |

OTHER PUBLICATIONS

"Advanced Video Coding for Generic Audio Visual Services," ITU-T Recommendation H.264, Mar. 2010.
"Draft ITU-T Recommendation H.264 and Draft ISO/IEC 14 496-10 AVC," in Joint Video Team of ISO/IEC JTC1/SC29/WG11 & ITU-T SG16/Q.6 Doc. JVT-G050, T. Wieg, Ed., Pattaya, Thailand, Mar. 2003.
Benjamin Bross, et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d6, 6th Meeting: Torino, IT, Nov. 2011, pp. i-xii, 1-14, 38-40, 71-73 and 103-118.
Detlev Marpe, et al, "Context-Based Adaptive Binary Arithmetic Coding in the H.264/AVC Video Compression Standard", IEEE Transactions on Circuits and Systems for Video Technology, vol. 13, No. 7, Jul. 2003.
Extended European Search Report dated Feb. 26, 2018 in European Patent Application No. 17204482.8.
Extended European Search Report dated Oct. 13, 2014 in corresponding European Application No. 12802237.3.
Hisao Sasai, et al., "Modified MVD Coding for CABAC", Joint Collaborative Team on Video Coding (JCT-VC) of ITU-T SG16 WP3 and ISO/IEC JTC1/SC29/WG11, JCTVC-F423, 6th Meeting: Torino, IT, Jul. 2011, pp. 1-6.
International Search Report dated Sep. 11, 2012 in International Application No. PCT/JP2012/004014.
Jia-Wei Liang, et al., "A High Throughput Parallel AVC/H.264 Context-Based Adaptive Binary Arithmetic Decoder", ICASSP, XP032001165, 2011, pp. 1729-1732.
Madhukar Budagavi, et al., "Parallel Context Processing Techniques for High Coding Efficiency Entropy Coding in HEVC", Joint Collaborative Team on Video Coding (JCT-VC) of ITU-T SG16 WP3 and ISO/IEC JTCI/SC29/WG11, JCTVC-B088, 2nd Meeting: Geneva, CH, Jul. 21-28, 2010.
Martin Boliek, et al., "Very High Speed Entropy Coding", Proceedings of the International Conference on Image Processing (ICIP), Nov. 13-16, 1994, IEEE Comp. Soc. Press, vol. 3, pp. 625-629.
Office Action dated Aug. 2, 2016 in U.S. Appl. No. 14/041,147.
Office Action dated Jan. 31, 2014 in U.S. Appl. No. 13/529,384.
Office Action dated Jan. 31, 2014 in U.S. Appl. No. 14/041,043.
Office Action dated Jun. 9, 2017 in European Patent Application No. 12802237.3.
Office Action dated Mar. 21, 2014 in U.S. Appl. No. 13/816,838.
Office Action dated Mar. 26, 2014 in U.S. Appl. No. 14/022,642.
Search Report dated May 17, 2016 in Taiwanese Patent Application No. 101122233, with English translation.
Shinya Shimizu, et al., "Decoder-Side Macroblock Information Derivation for Efficient Multiview Video Plus Depth Map Coding", 3DTV Conference: The True Vision—Capture, Transmission and Display of 3D Video (3DTV-CON), IEEE, May 16, 2011, pp. 1-4.
Thomas Wiegand, et al, "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, 5th Meeting, Geneva, CH, Mar. 16-23, 2011.
Thomas Wiegand, et al., "Draft ITU-T Recommendation and Final Draft International Standard of Joint Video Specification (ITU-T Rec. H264 ISO/IEC 14496-10 AVC)", Joint Video Team (JVT) of ISO/IEC MPEG & ITU-T VCEG (ISO/IEC JTC1/SC29/WG11 and ITU-T SG16 Q.6, JVT-G050rl, 8th Meeting: Geneva, Switzerland, May 23-27, 2003.
Vivienne Sze, et al., Texas Instruments Inc., "Parallel CABAC", International Telecommunication Union, Telecommunication Standardization Sector, Apr. 2008.
Vivienne Sze, et al., "Joint Algorithm-Architecture Optimization of CABAC", Joint Collaborative Team on Video Coding (JCT-VC) of ITU-T SG16 WP3 and ISO/IEC JTC1/SC29/WG11, JCTVC-E324, 5th Meeting: Geneva, CH, Mar. 2011, pp. 1-7.
Vivienne Sze, et al., "Parallel CABAC", International Telecommunication Union, Telecommunication Standardization Sector, COM 16-334-E, Apr. 2008.
Vivienne Sze, et al., "Parallel Context Processing of Coefficient Level", Joint Collaborative Team on Video Coding (JCT-VC) of ITU-T SG16 WP3 and ISO/IEC JTC1/SC29/WG11, JCTVC-F130, 6th Meeting: Torino, IT, Jul. 14-22, 2011.
Wei-Jung Chien, et al., "Adaptive Resolution on Motion Vector Difference", JCT-VC Meeting; 97, MPEG Meeting; Jul. 14, 2011-Jul. 22, 2011; Torino, IT; Joint Collaborative Team on Video Coding

(56) References Cited

OTHER PUBLICATIONS (JCT-VC) of ITU-T SG16 WP3 and ISO/IEC JTCI/SC29/WG11; URL: http://wftp3.itu.int/av-arch/jctvc-site/; No. JCTVC-F567, Jul. 2, 2011 (Jul. 2, 2011).

Yong Ho Moon, et al., "A Hybrid Motion-Vector Coding Scheme Based on an estimation of the locality for motion-vector difference", IEEE Transactions on Circuits and Systems for Video Technology, Institute of Electronical and Electronics Engineers, USA, vol. 16, No. 6, Jun. 1, 2006, pp. 781-785, XP001548831.

| Motion vector difference value | Prefix portion | Suffix portion |
|---|---|---|
| 0 | 0 | |
| 1 | 1 0 | |
| 2 | 1 1 0 | |
| 3 | 1 1 1 0 | |
| 4 | 1 1 1 1 0 | |
| 5 | 1 1 1 1 1 0 | |
| 6 | 1 1 1 1 1 1 0 | |
| 7 | 1 1 1 1 1 1 1 0 | |
| 8 | 1 1 1 1 1 1 1 1 0 | |
| 9 | 1 1 1 1 1 1 1 1 | 0000 |
| 10 | 1 1 1 1 1 1 1 1 | 0001 |
| ... | ... | ... |

FIG. 13

| prediction_unit( x0, y0, log2PUWidth, log2PUHeight, PartIdx, inferredMergeFlag ) { | Descriptor |
|---|---|
|   if( skip_flag[ x0 ][ y0 ] ) { | |
|     if( NumMergeCand > 1 ) | |
|       merge_idx[ x0 ][ y0 ] | ue(v) \| ae(v) |
|   } else if( PredMode == MODE_INTRA ) { | |
|     prev_intra_luma_pred_flag[ x0 ][ y0 ] | u(1) \| ae(v) |
|     if( prev_intra_luma_pred_flag[ x0 ][ y0 ] ) | |
|       if( NumMPMCand > 1 ) | |
|         mpm_idx[ x0 ][ y0 ] | u(1) \| ae(v) |
|     else | |
|       rem_intra_luma_pred_mode[ x0 ][ y0 ] | ce(v) \| ae(v) |
|     intra_chroma_pred_mode[ x0 ][ y0 ] | ue(v) \| ae(v) |
|   } else { /* MODE_INTER */ | |
|     if( !InferredMergeFlag ) | |
|       if( entropy_coding_mode_flag \|\| PartMode != PART_2Nx2N ) | |
|         merge_flag[ x0 ][ y0 ] | u(1) \| ae(v) |
|     if( merge_flag[ x0 ][ y0 ] && NumMergeCand > 1 ) { | |
|       merge_idx[ x0 ][ y0 ] | ue(v) \| ae(v) |
|     } else { | |
|       if( slice_type == B ) | |
|         inter_pred_flag[ x0 ][ y0 ] | ue(v) \| ae(v) |
|       if( inter_pred_flag[ x0 ][ y0 ] == Pred_LC ) { | |
|         if( num_ref_idx_lc_active_minus1 > 0 ) | |
|           ref_idx_lc[ x0 ][ y0 ] | ue(v) \| ae(v) |
|         mvd_lc[ x0 ][ y0 ] | se(v) \| ae(v) |
|         if( NumMVPCand( LcToLx ) > 1 ) | |
|           mvp_idx_lc[ x0 ][ y0 ] | ue(v) \| ae(v) |
|       } | |
|       else { /* Pred_L0 or Pred_BI */ | |
|         if( num_ref_idx_l0_active_minus1 > 0 ) | |
|           ref_idx_l0[ x0 ][ y0 ] | ue(v) \| ae(v) |
|         mvd_l0[ x0 ][ y0 ] | se(v) \| ae(v) |
|         if( NumMVPCand( L0 ) > 1 ) | |
|           mvp_idx_l0[ x0 ][ y0 ] | ue(v) \| ae(v) |
|       } | |
|       if( inter_pred_flag[ x0 ][ y0 ] == Pred_BI ) { | |
|         if( num_ref_idx_l1_active_minus1 > 0 ) | |
|           ref_idx_l1[ x0 ][ y0 ] | ue(v) \| ae(v) |
|         mvd_l1[ x0 ][ y0 ] | se(v) \| ae(v) |
|         if( NumMvPCand( L1 ) > 1 ) | |
|           mvp_idx_l1[ x0 ][ y0 ] | ue(v) \| ae(v) |
|       } | |
|     } | |
|   } | |
| } | |

701 → mvd_lc[ x0 ][ y0 ]
702 → mvd_l0[ x0 ][ y0 ]
703 → mvd_l1[ x0 ][ y0 ]

FIG. 17

| | Descriptor |
|---|---|
| mvd_coding(mvd_x, mvd_y) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater1_flag[ 0 ] ) { | |
|     abs_mvd_minus2[ 0 ] | ae(v) |
|     mvd_sign_flag[ 0 ] | ae(v) |
|   } | |
|   if( abs_mvd_greater0_flag[ 1 ] ) { | |
|   if( abs_mvd_greater1_flag[ 1 ] ) | |
|     abs_mvd_minus2[ 1 ] | ae(v) |
|     mvd_sign_flag[ 1 ] | ae(v) |
|   } | |
|   mvd_x = abs_mvd_greater0_flag[ 0 ] * ( abs_mvd_minus2[ 0 ] + 2 ) * | |
|     ( 1 - 2 * mvd_sign_flag[ 0 ] ) | |
|   mvd_y = abs_mvd_greater0_flag[ 1 ] * ( abs_mvd_minus2[ 1 ] + 2 ) * | |
|     ( 1 - 2 * mvd_sign_flag[ 1 ] ) | |
| } | |

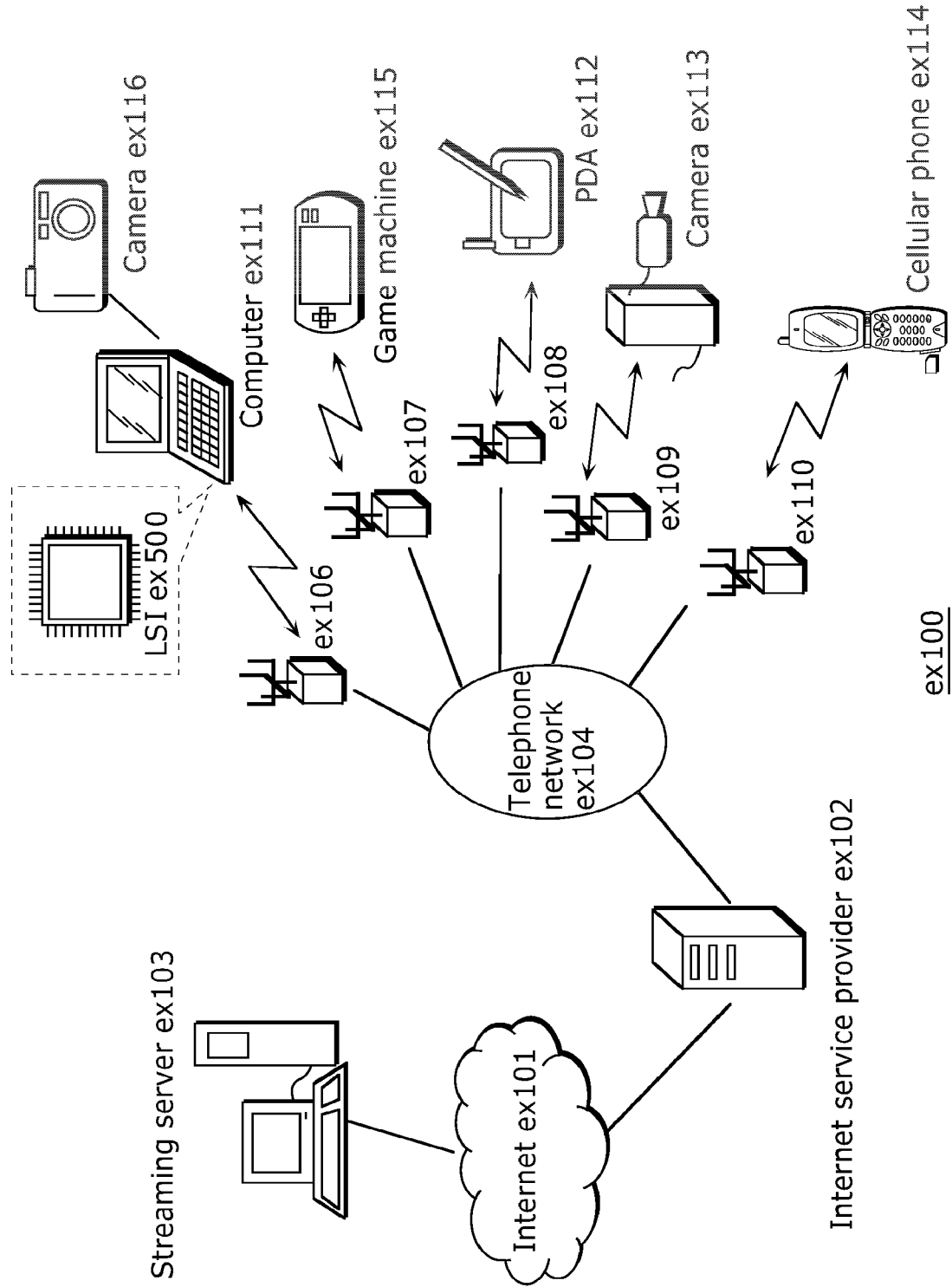

FIG. 24

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 27
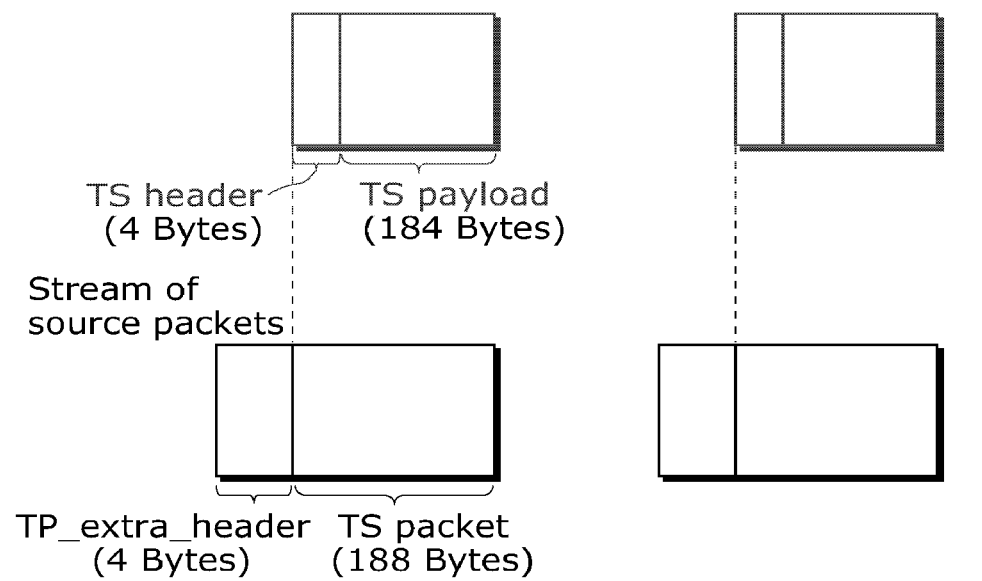
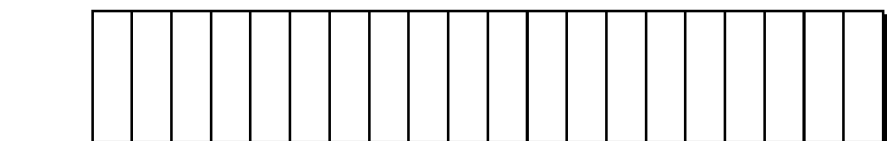

FIG. 35

| Corresponding standard | Driving frequency |
|---|---|
| MPEG-4 AVC | 500 MHz |
| MPEG-2 | 350 MHz |
| ⋮ | ⋮ |

IMAGE CODING METHOD FOR ENCODING A DIFFERENCE MOTION VECTOR INTO AND DECODING A DIFFERENCE MOTION VECTOR FROM A BITSTREAM

RELATED APPLICATIONS

This application is a continuation of U.S. application Ser. No. 15/498,840 filed Apr. 27, 2017, which is a continuation of U.S. application Ser. No. 14/041,043 filed Sep. 30, 2013, now U.S. Pat. No. 9,681,130, which is a divisional of U.S. application Ser. No. 13/529,384 filed Jun. 21, 2012, now U.S. Pat. No. 8,855,207, which claims the benefit of U.S. Provisional Application No. 61/500,805 filed Jun. 24, 2011, the entire disclosures of which are hereby incorporated herein by reference.

TECHNICAL FIELD

One or more exemplary embodiments disclosed herein relate generally to image coding methods for coding images using motion vectors.

BACKGROUND ART

Examples of techniques regarding an image coding method for coding images using motion vectors include techniques described in Non Patent Literatures (NPLs) 1 and 2.

CITATION LIST

Non Patent Literature

[NPL 1] ITU-T Recommendation H.264 "Advanced video coding for generic audio visual services", March, 2010

[NPL 2] JCT-VC "WD3: Working Draft 3 of High-Efficiency Video Coding", JCTVC-E603, March 2011

SUMMARY OF INVENTION

Technical Problem

Inefficient coding of an image causes delay in processing and also affects decoding of the image.

In view of this, one non-limiting and exemplary embodiment provides an image coding method for efficiently coding information constituting an image.

Solution to Problem

Additional benefits and advantages of the disclosed embodiments will be apparent from the Specification and Drawings. The benefits and/or advantages may be individually obtained by the various embodiments and features of the Specification and Drawings which need not all be provided in order to obtain one or more of the same.

In one general aspect, the techniques disclosed here feature an image coding method for coding an image using a motion vector, the method including coding a motion vector difference indicating a difference between the motion vector and a predicted motion vector which is a predicted value of the motion vector, wherein the coding includes: coding a first portion that is a part of a first component which is one of a horizontal component and a vertical component of the motion vector difference; coding a second portion that is a part of a second component which is different from the first component and is the other one of the horizontal component and the vertical component; coding a third portion that is a part of the first component and is different from the first portion; coding a fourth portion that is a part of the second component and is different from the second portion; and generating a code string which includes the first portion, the second portion, the third portion, and the fourth portion in an order of the first portion, the second portion, the third portion, and the fourth portion.

These general and specific aspects may be implemented using an apparatus, a system, an integrated circuit, a computer program, or a non-transitory computer-readable recording medium such as a CD-ROM, or any combination of apparatuses, systems, integrated circuits, computer programs, or recording media.

Advantageous Effects of Invention

Information constituting an image is efficiently coded according to exemplary embodiments disclosed herein.

BRIEF DESCRIPTION OF DRAWINGS

These and other advantages and features will become apparent from the following description thereof taken in conjunction with the accompanying Drawings. In the Drawings:

FIG. 13 is a syntax table showing an example of a data structure;

FIG. 17 is a syntax table showing an example of a data structure of a code string corresponding to a motion vector difference;

FIG. 18 shows an overall configuration of a content providing system for implementing content distribution services;

FIG. 24 illustrates a structure of multiplexed data;

FIG. 27 shows a structure of TS packets and source packets in the multiplexed data;

FIG. 35 shows an example of a look-up table in which video data standards are associated with driving frequencies;

Figure 1:
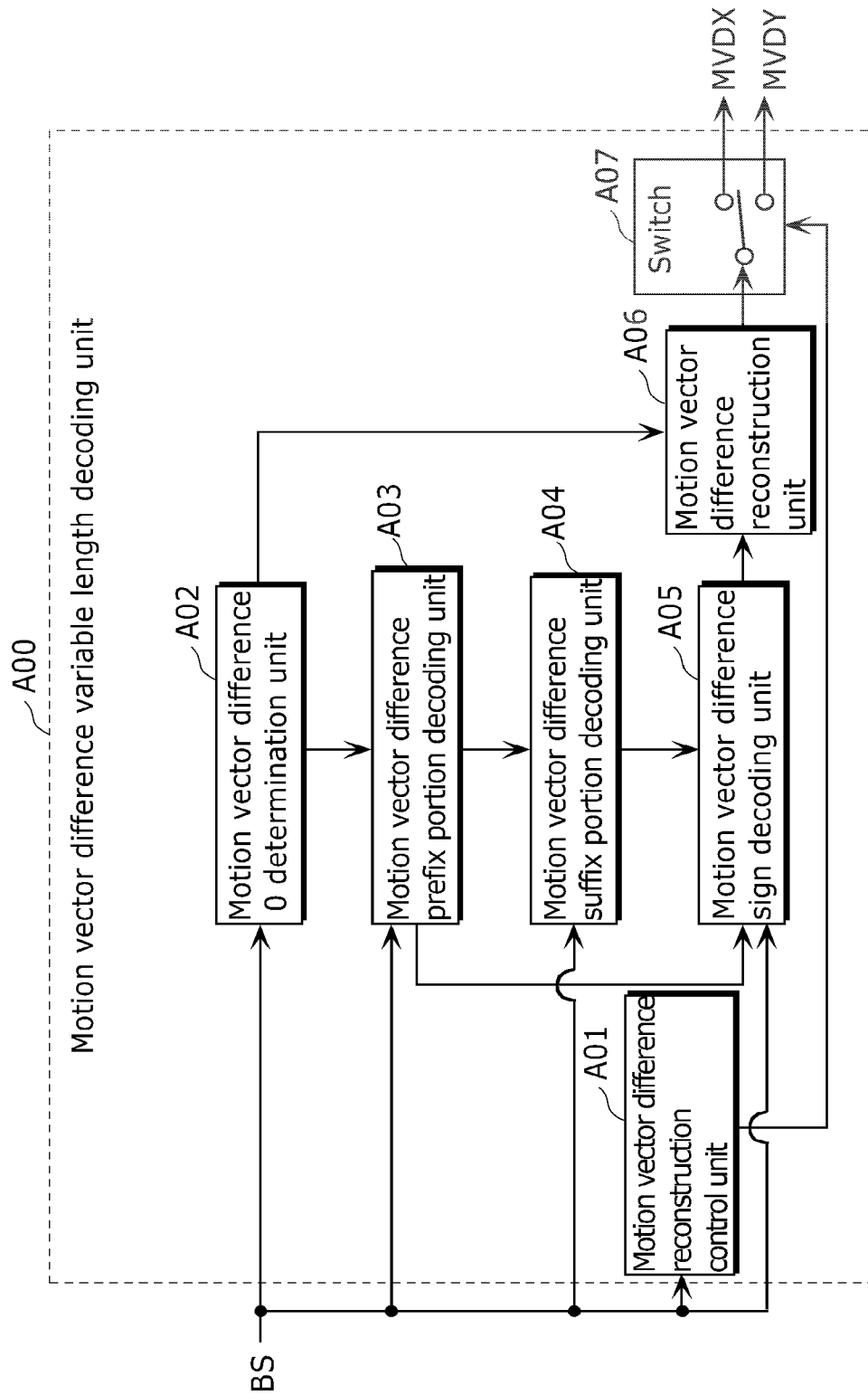
FIG. 1 is a block diagram showing an example of a configuration of a conventional motion vector difference decoding method.

DESCRIPTION OF EMBODIMENTS (Underlying Knowledge Forming Basis of the Present Disclosure)

The number of applications for, for example, video-on-demand type services which include video conference via the Internet, digital video broadcasting, and streaming of video content is continuously increasing, and these applications are dependent on transmission of video information. When video data is transmitted or recorded, a considerable amount of data is transmitted through a conventional transmission channel having a limited band width, or is stored in a conventional storage medium having a limited data capacity. It is necessary to compress or reduce the amount of digital data, in order to transmit video information via a conventional transmission channel and store video information in a conventional storage medium.

In view of this, a plurality of video coding standards have been developed to compress video data. Examples of such video coding standards include the ITU-T standard typified by H.26x, and the ISO/IEC standard typified by MPEG-x. The latest and most advanced video coding standard at present is a standard typified by H.264/MPEG-4 AVC (see Non-Patent Literature (NPL) 1).

A coding approach which is the basis of most of these standards is based on prediction coding which includes main steps shown by (a) to (d) below. Step (a): Divide video frames into pixel blocks, to perform data compression on each video frame at a block level. Step (b): Identify temporal and spatial redundancy by predicting individual blocks from video data previously coded. Step (c): Eliminate the identified redundancy by subtracting predicted data from the video data. Step (d): Compress the remaining data (residual block) by performing Fourier transform, quantization, and entropy coding.

In the above step (a), prediction modes used to predict macroblocks are different for current video coding standards. Most of the video coding standards use motion detection and motion compensation, in order to predict video data from a frame coded and decoded previously (inter-frame prediction). Alternatively, block data may be extrapolated from an adjacent block in the same frame (intra-frame prediction).

For example, when a coding target picture is to be coded using inter-frame prediction, an image coding apparatus uses, as a reference picture, a coded picture that appears before or after the coding target picture in the display order. Then, the image coding apparatus performs motion detection on the coding target picture relative to the reference picture, thereby deriving a motion vector of each block. The image coding apparatus performs motion compensation using the motion vectors derived in this way, to generate predicted image data. Then, the image coding apparatus codes a difference between the generated predicted image data and image data of the coding target picture, thus reducing redundancy in the time direction.

Further, it is considered to use a predicted motion vector designation mode when a motion vector of a coding target block in a B-picture or a P-picture is coded (NPL 2). An image coding apparatus using the predicted motion vector designation mode generates a plurality of candidates for a predicted motion vector, based on blocks for which coding has been performed and which are adjacent to a coding target block. Then, the image coding apparatus selects a predicted motion vector from among the plurality of generated candidates.

The image coding apparatus codes a motion vector of the coding target block using the selected predicted motion vector. Specifically, variable length coding is performed on a motion vector difference between the motion vector of the coding target block and the selected predicted motion vector.

Further, the image coding apparatus adds an index (also referred to as a predicted motion vector index) of the selected predicted motion vector to a coded bit stream. Accordingly, at the time of decoding, the image decoding apparatus can select a predicted motion vector that is the same as the predicted motion vector selected when coding is performed.

Figure 2:
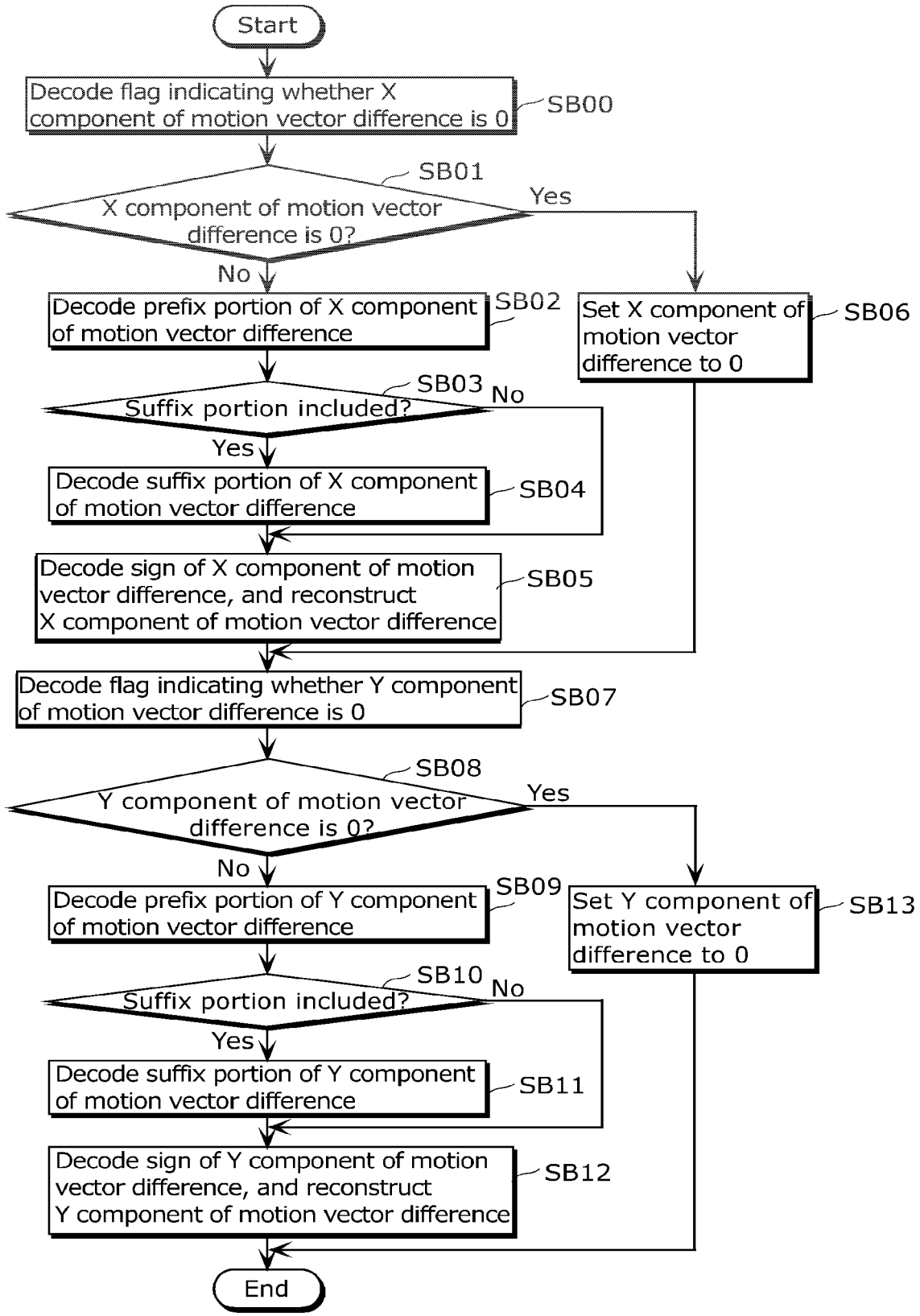
FIG. 2 is a flowchart showing a flow of operation of the conventional motion vector difference decoding method.

In addition, a more specific description of a method for performing variable length decoding on a motion vector difference is given using FIGS. 1 and 2. FIG. 1 is a block diagram showing an example of a configuration of a conventional method for performing variable length decoding on a motion vector difference. FIG. 2 is a flowchart showing an example of the flow of operation of the conventional method for performing variable length decoding on a motion vector difference.

Motion vector difference values are binarized, and constitute binary strings. Binary strings can be each separated into a flag indicating a (plus or minus) sign, a prefix portion corresponding to a portion of the absolute value of a motion vector difference smaller than or equal to a threshold (TH) value, and a suffix portion corresponding to a portion thereof greater than the TH value (see FIG. 6).

A sign is + or −. For example, if a sign is +, a flag which indicates the sign is 0. If a sign is −, a flag which indicates the sign is 1. Further, the TH value is 8, for example. In this case, a prefix portion corresponds to a portion constituting eight or less in a binarized string of the absolute value of a motion vector difference. A suffix portion corresponds to a portion which constitutes nine or more in a binarized string of the absolute value of a motion vector difference.

Arithmetic coding and decoding methods are different for the flag indicating a sign, the prefix portion, and the suffix portion. Arithmetic coding and decoding methods will be described below.

A motion vector difference variable length decoding unit A00 obtains a bit stream BS which includes motion vector difference information, and inputs the obtained bit stream BS to a motion vector difference reconstruction control unit A01 and a motion vector difference 0 determination unit A02. It should be noted that here, the motion vector difference reconstruction control unit A01 takes in an X component (horizontal component) and a Y component (vertical component) of the obtained motion vector difference information in the stated order, and manages whether a component of the motion vector difference information on which decoding processing is being performed is an X component or a Y component.

The motion vector difference 0 determination unit A02 decodes, from the obtained bit stream, a flag indicating whether the X component of the motion vector difference is 0 (step SB00). If the X component of the motion vector difference is not 0 (NO in step SB01), a motion vector difference prefix portion decoding unit A03 decodes the prefix portion of the X component of the motion vector difference (step SB02). Next, if the X component of the motion vector difference includes the suffix portion (YES in step SB03), a motion vector difference suffix portion decoding unit A04 decodes the suffix portion of the X component of the motion vector difference (SB04). If the X component does not include the suffix portion (NO in SB03), suffix decoding processing is skipped. Next, a motion vector difference sign decoding unit A05 decodes the sign of the X component of the motion vector difference, and a motion vector difference reconstruction unit A06 reconstructs and sets the X component of the motion vector difference (SB05).

On the other hand, if the X component of the motion vector difference is 0 (YES in step SB01), the motion vector difference reconstruction unit A06 sets the X component of the motion vector difference to 0 (step SB06). Here, the motion vector difference reconstruction control unit A01 switches a switch A07 to a side indicating an X component (a terminal on an upper side in FIG. 1), and outputs the X component of the motion vector difference.

Next, a Y component of the motion vector difference is decoded as with the case of the X component. It should be noted that in the following procedure of the operation, step SB07 corresponds to step SB00, step SB08 corresponds to step SB01, step SB09 corresponds to step SB02, step SB10 corresponds to step SB03, step SB11 corresponds to step SB04, step SB12 corresponds to step SB05, and step SB13 corresponds to step SB06. Accordingly, the operation in these steps is the same except that the components are different, and thus a detailed description is omitted.

At the end of all the steps, the X component and the Y component of the motion vector difference are reconstructed.

Next is a description of variable length coding on a difference between predicted image data and image data of a coding target picture and a motion vector difference between a predicted motion vector and a motion vector, and the like. In H.264, one of the variable length coding methods is context adaptive binary arithmetic coding (CABAC). The following is a description of this CABAC using FIGS. 3, 4, and 5.

Figure 3:
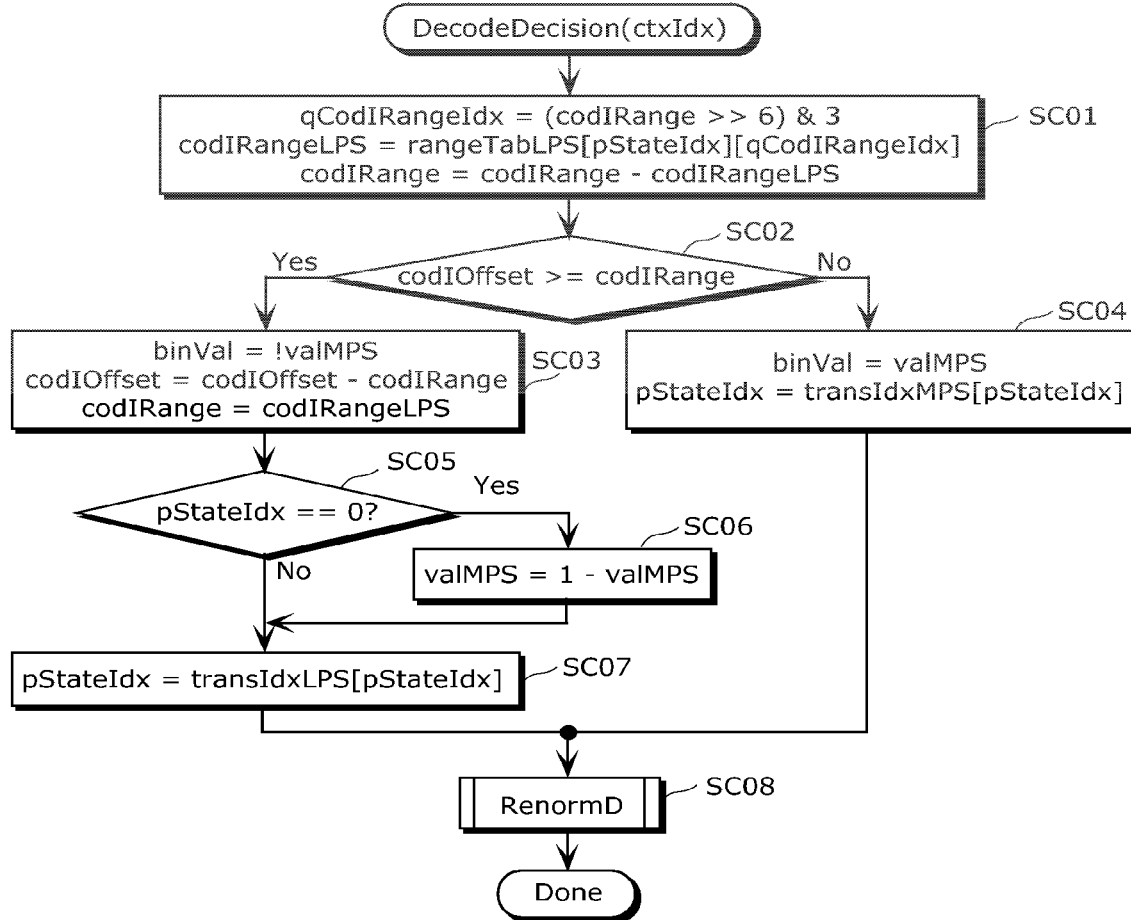
FIG. 3 is a flowchart showing context adaptive binary arithmetic decoding processing of the conventional arithmetic decoding method.

FIG. 3 shows the flow of conventional context adaptive binary arithmetic decoding processing mentioned above. It should be noted that this drawing is extracted from NPL 1, and is as described in NPL 1, unless a description is particularly given.

In arithmetic decoding processing, first, a context (ctxIdx) determined based on a signal type is input.

Next, a value qCodIRangeIdx derived from a parameter codIRange which indicates the state in an arithmetic decoding apparatus at this point in time is calculated, and a pStateIdx value which is a state value corresponding to ctxIdx is obtained. Using the two values, codIRangeLPS is obtained by referring to a table (rangeTableLPS). It should be noted that this codIRangeLPS indicates a value corresponding to the first parameter codIRange indicating the state in the arithmetic decoding apparatus when LPS (indicating a symbol 0 or 1 whose probability of occurrence is the lower) has occurred.

Further, a value obtained by decrementing the current codIRange by the above codIRangeLPS is put in codIRange (step SC01). Next, the calculated codIRange is compared with a second parameter codIOffset indicating the state in the arithmetic decoding apparatus (step SC02).

If codIOffset is equal to or greater than the second parameter (YES in SC02), it is determined that the symbol of LPS has occurred. Then, binVal which is a decoded output value is set to a value different from valMPS (a specific value (0 or 1) of MPS which indicates a symbol 0 or 1 whose probability of occurrence is the higher), the different value being 0 in the case of valMPS=1 and 1 in the case of valMPS=0. Further, the second parameter codIOffset indicating the state in the arithmetic decoding apparatus is set to a value obtained as a result of decrement by codIRange. Since LPS has occurred, the first parameter codIRange indicating the state in the arithmetic decoding apparatus is set to the value of codIRangeLPS calculated in step SC01 (step SC03).

It should be noted that here, if the above pStateIdx value which is a state value corresponding to ctxIdx is 0 (YES in step SC05), the case where the probability of LPS exceeds the probability of MPS is indicated. Thus, valMPS is switched (to 0 in the case of valMPS=1 and to 1 in the case of valMPS=0) (step SC06). On the other hand, if the pStateIdx value is not 0 (NO in step SC05), the pStateIdx value is updated based on a transition table transIdxLPS used when LPS occurs (step SC07).

If codIOffset is smaller (NO in SC02), it is determined that the symbol of MPS has occurred. Then, binVal which is a decoded output value is set to valMPS, and the pStateIdx value is updated based on a transition table transIdxMPS used when MPS occurs (step SC04).

At last, normalization processing (RenormD) is performed (step SC08), and arithmetic decoding ends.

As described above, in context adaptive binary arithmetic decoding processing, a plurality of symbol occurrence probabilities which are the probabilities of occurrence of binary symbols are held in association with context indexes, and switched according to conditions (by referring to a value of an adjacent block, for example). Thus, it is necessary to keep the order of processing.

Figure 4:
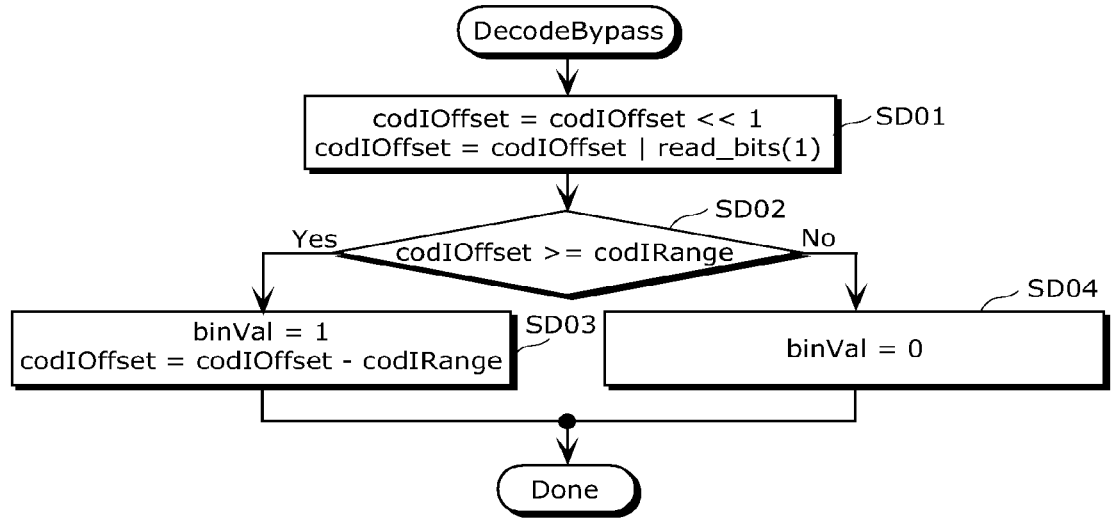
FIG. 4 is a flowchart showing bypass arithmetic decoding processing of the conventional arithmetic decoding method.

FIG. 4 shows the flow of the above conventional arithmetic decoding processing for bypass processing. It should be noted that this drawing is extracted from NPL 1, and is as described in NPL 1, unless a description is particularly given.

First, the second parameter codIOffset indicating the state in the arithmetic decoding device at this point in time is shifted to the left (doubled), and one bit is read from a bit stream. If the read bit indicates 1, 1 is added to the doubled second parameter codIOffset, whereas if the value indicates 0, the second parameter codIOffset is set to the as-is value (which has been doubled) (SD01).

Next, if codIOffset is greater than or equal to the first parameter codIRange indicating the state in the arithmetic decoding device (YES in SD02), binVal which is a decoded output value is set to "1". Then, codIOffset is set to a value obtained as a result of decrement by codIRange (step SD03). On the other hand, if codIOffset is smaller than the first parameter codIRange which indicates the state in the arithmetic decoding device (NO in SD02), binVal which is a decoded output value is set to "0" (step SD04).

Figures 5, 6:
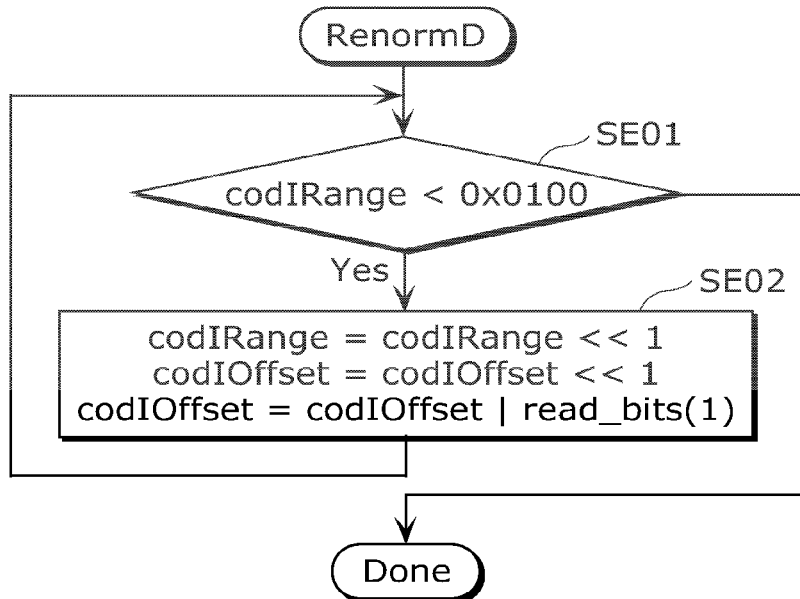
FIG. 5 is a flowchart showing normalization processing of the conventional arithmetic decoding method.
FIG. 6 is a schematic diagram showing examples of binary strings of motion vector differences.

FIG. 5 is a flowchart for describing in detail the normalization processing (RenormD) shown by step SC08 in FIG. 3. This drawing is extracted from NPL 1, and is as described in NPL 1, unless a description is particularly given.

If the first parameter codIRange indicating the state in the arithmetic decoding apparatus becomes smaller than 0x100 (in hexadecimal: 256 (in decimal)) as a result of arithmetic decoding processing (YES in step SE01), codIRange is shifted to the left (doubled), and the second parameter codIOffset indicating the state in the arithmetic decoding device is shifted to the left (doubled). Then, one bit is read from a bit stream. If the read bit indicates 1, 1 is added to the doubled second parameter codIOffset, whereas if the value indicates 0, the second parameter codIOffset is set to the as-is value (which has been doubled) (SE02).

At the point in time when codIRange has eventually become 256 or greater (NO in step SE01), this processing ends.

Arithmetic decoding is performed on a motion vector difference by performing the above processing shown in FIGS. 3, 4, and 5.

However, conventionally, when arithmetic coding is performed on a motion vector difference between a predicted motion vector and a motion vector, an X component and a Y component of the motion vector difference are coded in order. Specifically, an X component of the motion vector difference and a Y component of the motion vector difference are stored separately in a coded stream. Thus, context adaptive binary arithmetic coding and bypass coding are alternately executed on each of an X component and a Y component at the time of coding, and context adaptive binary arithmetic decoding and bypass decoding are alternately executed on each of an X component and a Y component at the time of decoding, resulting in a problem that sufficient parallel processing is not allowed which is an advantage of bypass coding and decoding.

In view of this, an image coding method according to an exemplary embodiment of the present disclosure is an image coding method for coding an image using a motion vector, the method including coding a motion vector difference indicating a difference between the motion vector and a predicted motion vector which is a predicted value of the motion vector, wherein the coding includes: coding a first portion that is a part of a first component which is one of a horizontal component and a vertical component of the motion vector difference; coding a second portion that is a part of a second component which is different from the first component and is the other one of the horizontal component and the vertical component; coding a third portion that is a part of the first component and is different from the first portion; coding a fourth portion that is a part of the second component and is different from the second portion; and generating a code string which includes the first portion, the second portion, the third portion, and the fourth portion in an order of the first portion, the second portion, the third portion, and the fourth portion.

Accordingly, a part of the horizontal component of the motion vector difference and a part of the vertical component of the motion vector difference are combined in the code string. For example, if a portion for which bypass decoding is to be used and which is included in the horizontal component and a portion for which bypass decoding is to be used and which is included in the vertical component are combined in a code string, the degree of parallelism of decoding processing may be increased. In other words, the motion vector difference is efficiently coded by combining a part of the horizontal component and a part of the vertical component.

For example, the coding the motion vector difference may include: coding the third portion which includes a plus or minus sign of the first component, and coding the fourth portion which includes a plus or minus sign of the second component; and generating the code string which includes the first portion, the second portion, the third portion, and the fourth portion in the order of the first portion, the second portion, the third portion, and the fourth portion.

Accordingly, the sign of the horizontal component and the sign of the vertical component are combined in the code string. Typically, bypass decoding is used for decoding the signs. Therefore, the degree of parallelism of decoding processing may be increased.

Further, for example, the coding the motion vector difference may include: coding the first portion which includes a flag indicating whether the first component is 0, and coding the second portion which includes a flag indicating whether the second component is 0; and generating the code string which includes the first portion, the second portion, the third portion, and the fourth portion in the order of the first portion, the second portion, the third portion, and the fourth portion.

Accordingly, the flag indicating whether the horizontal component is 0 and the flag indicating whether the vertical component is 0 are combined in the code string. Typically, context adaptive binary arithmetic decoding is used for decoding the flags. A plurality of different portions for which bypass decoding is to be used are combined in the code string by combining the flags in the code string. Therefore, the degree of parallelism of decoding processing may be increased.

Further, for example, the coding the motion vector difference may include: coding the third portion which includes a difference between a threshold value and an absolute value of the first component when the absolute value of the first component is greater than the threshold value; coding the fourth portion which includes a difference between the threshold value and an absolute value of the second component when the absolute value of the second component is greater than the threshold value; and generating the code string which includes the first portion, the second portion, the third portion, and the fourth portion in the order of the first portion, the second portion, the third portion, and the fourth portion.

Accordingly, the difference between the threshold value and the absolute value of the horizontal component and the difference between the threshold value and the absolute value of the vertical component are combined in the code string. Typically, bypass decoding is used for decoding these differences. Therefore, the degree of parallelism of decoding processing may be increased.

Further, for example, the coding the motion vector difference may include: coding the first portion and the second portion by performing context adaptive binary arithmetic coding which is arithmetic coding in which a variable probability updated based on coded data is used; and generating the code string which includes the first portion, the second portion, the third portion, and the fourth portion in the order of the first portion, the second portion, the third portion, and the fourth portion.

Accordingly, a plurality of portions for which context adaptive binary arithmetic decoding is to be used are combined in the code string. In this case, a plurality of different portions for which bypass decoding is to be used are combined in the code string. Therefore, the degree of parallelism of decoding processing may be increased.

Further, for example, the coding the motion vector difference may include: coding the third portion and the fourth portion by performing bypass coding which is arithmetic coding in which a predetermined fixed probability is used; and generating the code string which includes the first portion, the second portion, the third portion, and the fourth portion in the order of the first portion, the second portion, the third portion, and the fourth portion.

Accordingly, a plurality of portions for which bypass decoding is to be used are combined in the code string. Therefore, the degree of parallelism of decoding processing may be increased.

Further, for example, in the coding the motion vector difference, the third portion and the fourth portion may be coded in parallel.

Accordingly, a part of the horizontal component and a part of the vertical component are coded in parallel. Therefore, the motion vector difference is coded efficiently.

Further, for example, the coding the motion vector difference may include: switching coding processing to first coding processing conforming to a first standard or to second coding processing conforming to a second standard, and generating a bit stream which includes identification information indicating the first standard or the second standard to which a corresponding one of the first coding processing and the second coding processing to which the coding processing has been switched conforms; and generating, when the coding processing is switched to the first coding processing, the code string which includes the first portion, the second portion, the third portion, and the fourth portion in the order of the first portion, the second portion, the third portion, and the fourth portion, and generating the bit stream which includes the code string and the identification information which indicates the first standard.

Accordingly, an apparatus which is to perform decoding is notified of whether a part of the horizontal component of the motion vector difference and a part of the vertical component of the motion vector difference are combined in the code string. Therefore, decoding processing can be switched appropriately.

Further, an image decoding apparatus according to an exemplary embodiment of the present disclosure may be an image decoding method for decoding an image using a motion vector, the method including decoding a motion vector difference indicating a difference between the motion vector and a predicted motion vector which is a predicted value of the motion vector, wherein the decoding may include: obtaining a code string which includes (i) a first portion that is a part of a first component which is one of a horizontal component and a vertical component of the motion vector difference, (ii) a second portion that is a part of a second component which is different from the first component and is the other one of the horizontal component and the vertical component, (iii) a third portion that is a part of the first component and is a different from the first portion, and (iv) a fourth portion which is a part of the second component and is different from the second portion, in an order of the first portion, the second portion, the third portion, and the fourth portion; and decoding the first portion included in the code string, decoding the second portion included in the code string, decoding the third portion included in the code string, and decoding the fourth portion included in the code string.

Accordingly, the code string is obtained in which a part of the horizontal component of the motion vector difference and a part of the vertical component of the motion vector difference are combined. For example, if a portion for which bypass decoding is to be used and which is included in the horizontal component and a portion for which bypass decoding is to be used and which is included in the vertical components are combined in the code string, the degree of parallelism of decoding processing may be increased. In other words, the motion vector difference is efficiently decoded by using the code string in which a part of the horizontal component and a part of the vertical component are combined.

For example, the decoding the motion vector difference may include: obtaining the code string which includes (i) the first portion, (ii) the second portion, (iii) the third portion which includes a plus or minus sign of the first component, and (iv) the fourth portion which includes a plus or minus sign of the second component, in the order of the first portion, the second portion, the third portion, and the fourth portion; and decoding the first portion included in the code string, decoding the second portion included in the code string, decoding the third portion included in the code string, and decoding the fourth portion included in the code string.

Accordingly, the code string is obtained in which the sign of the horizontal component and the sign of the vertical component are combined. Typically, bypass decoding is used for decoding the signs. Therefore, the degree of parallelism of decoding processing may be increased.

Further, for example, the decoding the motion vector difference may include: obtaining the code string which includes (i) the first portion which includes a flag indicating whether the first component is 0, (ii) the second portion which includes a flag indicating whether the second component is 0, (iii) the third portion, and (iv) the fourth portion, in the order of the first portion, the second portion, the third portion, and the fourth portion; and decoding the first portion included in the code string, decoding the second portion included in the code string, decoding the third portion included in the code string, and decoding the fourth portion included in the code string.

Accordingly, the code string is obtained in which the flag indicating whether the horizontal component is 0 and the flag indicating whether the vertical component is 0 are combined. Typically, context adaptive binary arithmetic decoding is used to decode these flags. A plurality of different portions for which bypass decoding is to be used are combined in the code string by combining these flags in the code string. Therefore, the degree of parallelism of decoding processing may be increased.

Further, for example, the decoding the motion vector difference may include: obtaining the code string which includes (i) the first portion, (ii) the second portion, and (iii) the third portion which includes a difference between a threshold value and an absolute value of the first component when the absolute value of the first component is greater than the threshold value, and (iv) the fourth portion which includes a difference between the threshold value and an absolute value of the second component when the absolute value of the second component is greater than the threshold value, in the order of the first portion, the second portion, the third portion, and the fourth portion; and decoding the first portion included in the code string, decoding the second portion included in the code string, decoding the third portion included in the code string, and decoding the fourth portion included in the code string.

Accordingly, the code string is obtained in which the difference between the threshold value and the absolute value of the horizontal component and the difference between the threshold value and the absolute value of the vertical component are combined. Typically, bypass decoding is used for decoding these differences. Therefore, the degree of parallelism of decoding processing may be increased.

Further, for example, the decoding the motion vector difference may include: obtaining the code string which includes (i) the first portion to be decoded by performing context adaptive binary arithmetic decoding which is arithmetic decoding in which a variable probability updated based on decoded data is used, (ii) the second portion to be decoded by performing the context adaptive binary arithmetic decoding, (iii) the third portion, and (iv) the fourth portion, in the order of the first portion, the second portion, the third portion, and the fourth portion; and decoding the first portion included in the code string by performing the context adaptive binary arithmetic decoding, decoding the second portion included in the code string by performing the context adaptive binary arithmetic decoding, decoding the third portion included in the code string, and decoding the fourth portion included in the code string.

Accordingly, the code string is obtained in which a plurality of portions for which context adaptive binary arithmetic decoding is to be used are combined. In this case, a plurality of different portions for which bypass decoding is to be used are combined in the code string. Therefore, the degree of parallelism of decoding processing may be increased.

Further, for example, the decoding the motion vector difference may include: obtaining the code string which includes (i) the first portion, (ii) the second portion, (iii) the third portion to be decoded by performing bypass decoding which is arithmetic decoding in which a predetermined fixed probability is used, and (iv) the fourth portion to be decoded by performing the bypass decoding, in the order of the first portion, the second portion, the third portion, and the fourth portion; and decoding the first portion included in the code string, decoding the second portion included in the code string, decoding the third portion included in the code string by performing the bypass decoding, and decoding the fourth portion included in the code string by performing the bypass decoding.

Accordingly, the code string is obtained in which a plurality of portions for which bypass decoding is to be used are combined. Therefore, the degree of parallelism of decoding processing may be increased.

Further, for example, in the decoding the motion vector difference, the third portion and the fourth portion may be decoded in parallel.

Accordingly, a part of the horizontal component and a part of the vertical component are decoded in parallel. Therefore, the motion vector difference is decoded efficiently.

Further, for example, the decoding the motion vector difference may include: obtaining a bit stream which includes identification information indicating a first standard or a second standard, and based on the identification information, switching decoding processing to first decoding processing conforming to the first standard or to second decoding processing conforming to the second standard; and when the decoding processing is switched to the first decoding processing, obtaining the code string from the bit stream, decoding the first portion included in the code string, decoding the second portion included in the code string, decoding the third portion included in the code string, and decoding the fourth portion included in the code string.

Accordingly, decoding processing is appropriately switched according to whether a part of the horizontal component of the motion vector difference and a part of the vertical component of the motion vector difference are combined in the code string.

Furthermore, these general and specific embodiments may be implemented using an apparatus, a system, an integrated circuit, a computer program, or a non-transitory computer-readable recording medium such as a CD-ROM, or any combination of apparatuses, systems, integrated circuits, computer programs, or recording media.

The following is a detailed description of an image coding method and an image decoding method according to exemplary embodiments of the present disclosure using drawings. Each of the exemplary embodiments described below shows a general or specific example. The numerical values, shapes, materials, constituent elements, the arrangement and connection of the constituent elements, steps, the processing order of the steps, and the like shown in the following exemplary embodiments are mere examples, and therefore do not limit the inventive concept, the scope of which is defined in the appended Claims and their equivalents. Therefore, among the constituent elements in the following exemplary embodiments, constituent elements not recited in any of the independent claims defining the most generic part of the inventive concept are described as arbitrary constituent elements.

Embodiment 1

Figure 7:
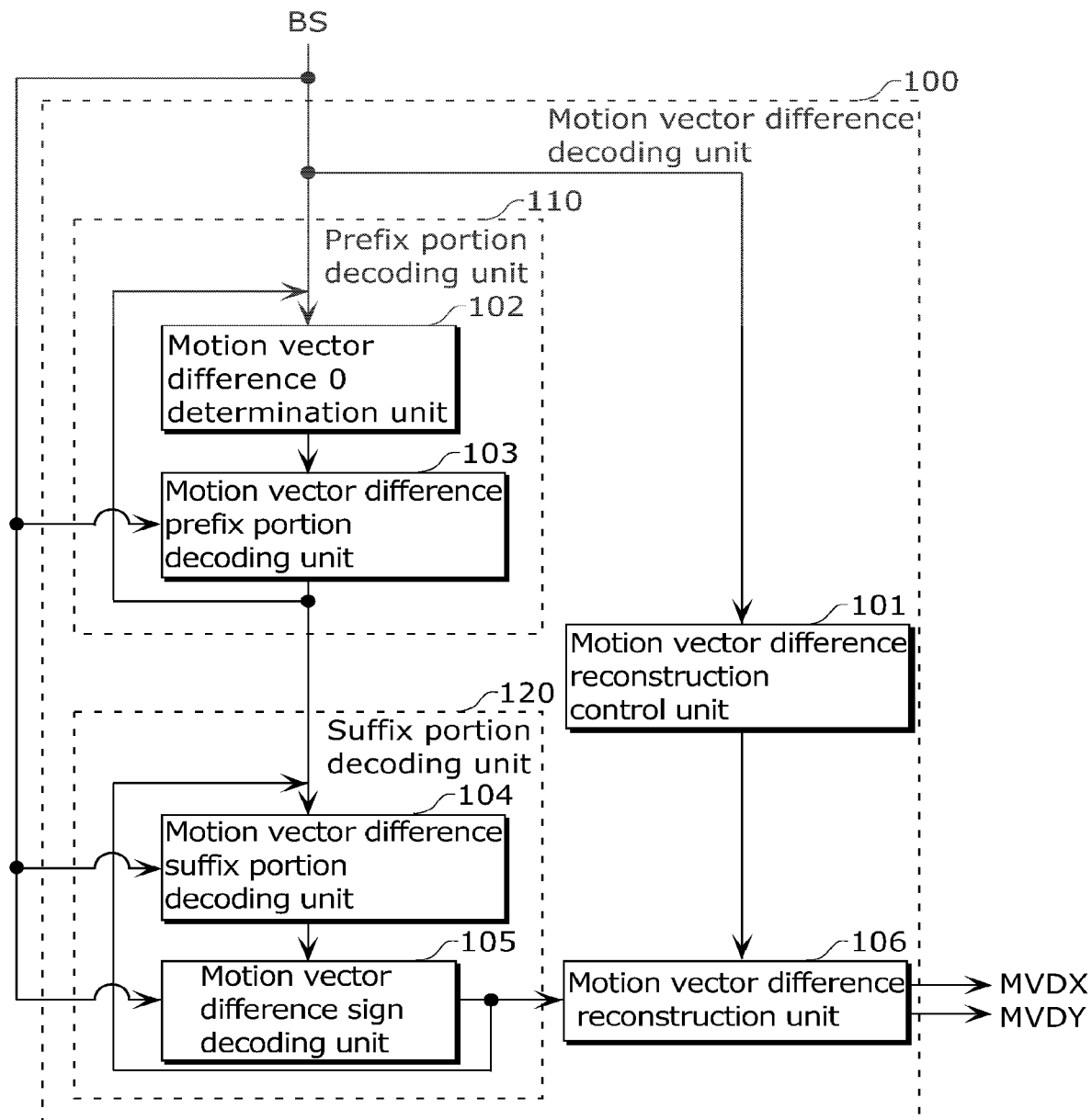
FIG. 7 is a block diagram showing a functional configuration of a decoding apparatus according to Embodiment 1.

FIG. 7 is a block diagram showing the functional configuration of a motion vector difference decoding unit 100 according to Embodiment 1.

The motion vector difference decoding unit 100 according to the present embodiment includes a prefix portion decoding unit 110, a suffix portion decoding unit 120, a motion vector difference reconstruction control unit 101, and a motion vector difference reconstruction unit 106. Among these, the prefix portion decoding unit 110 is constituted by a motion vector difference 0 determination unit 102 and a motion vector difference prefix portion decoding unit 103. Also, the suffix portion decoding unit 120 is constituted by a motion vector difference suffix portion decoding unit 104 and a motion vector difference sign decoding unit 105. The motion vector difference decoding unit 100 reconstructs, from a bit stream BS, information on an X component MVDX and a Y component MVDY of a motion vector difference.

Figure 8:
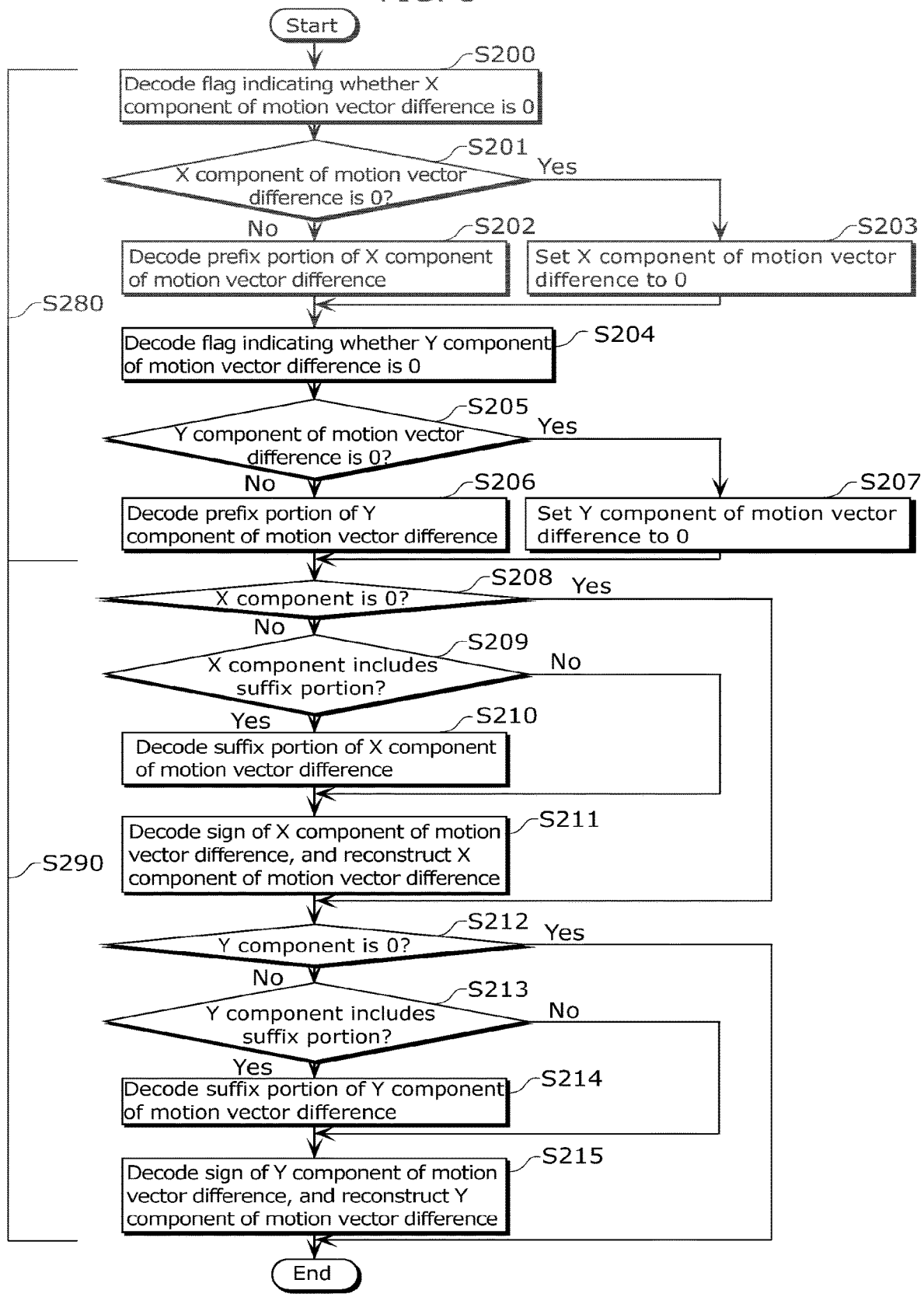
FIG. 8 is a flowchart showing processing operation of the decoding apparatus according to Embodiment 1.

The operation of the motion vector difference decoding unit 100 in the present embodiment is described in detail using FIG. 8. FIG. 8 is a flowchart showing an example of a flow of operation of the motion vector difference decoding unit 100 of the present embodiment.

First, the motion vector difference 0 determination unit 102 decodes, from an obtained bit stream, a flag which indicates whether an X component of a motion vector difference is 0 (S200). Here, if the X component of the motion vector difference is not 0 (NO in S201), the motion vector difference prefix portion decoding unit 103 decodes a prefix portion of the X component of the motion vector difference (S202). On the other hand, if the X component of the motion vector difference is 0 (YES in S201), the X component of the motion vector difference is set to 0 (S203).

Next, returning back to the processing from the loop, the motion vector difference 0 determination unit 102 decodes a flag which indicates whether the Y component of the motion vector difference is 0 (S204). If the Y component of the motion vector difference is not 0 here (NO in S205), the motion vector difference prefix portion decoding unit 103 decodes a prefix portion of the Y component of the motion vector difference (S206). On the other hand, if the Y component of the motion vector difference is 0 (YES in S205), the Y component of the motion vector difference is set to 0 (S207). It should be noted that the processing up to this step is the operation performed by the motion vector difference prefix portion decoding unit 103 (S280).

Next, if it is determined, based on decoded information on the X component of the motion vector difference, that the X component is not 0 (NO in S208), and includes a suffix portion (YES in S209), the motion vector difference suffix portion decoding unit 104 decodes, from the bit stream, the suffix portion of the X component of the motion vector difference (S210). On the other hand, if the suffix portion is not included (NO in S209), decoding processing on the suffix portion is skipped. It should be noted that here, regarding whether a suffix portion is included, the prefix portion and the suffix portion are separated in a binary code string as shown in FIG. 6, for example, and thus it is determined that a suffix portion is included if all the digits in a prefix portion are 1.

Next, the motion vector difference sign decoding unit 105 decodes, from the bit stream, the sign of the motion vector difference, and the motion vector difference reconstruction unit 106 reconstructs the X component of the motion vector difference (S211). On the other hand, if the X component is 0 (YES in S208), the X component of the motion vector difference has already been successfully reconstructed, and thus decoding processing on the suffix portion of the X component is skipped.

Next, if it is determined, based on decoded information on the Y component of the motion vector difference, that the Y component is not 0 (NO in S212), and includes a suffix portion (YES in S213), the motion vector difference suffix portion decoding unit 104 decodes, from the bit stream, the suffix portion of the Y component of the motion vector difference (S214). It should be noted that if the suffix portion is not included (NO in S213), decoding processing on the suffix portion is skipped. Here, whether a suffix portion is included may be determined in the same manner as the case of the X component. Next, the motion vector difference sign decoding unit 105 decodes, from the bit stream, the sign of the Y component of the motion vector difference, and the motion vector difference reconstruction unit 106 reconstructs the Y component of the motion vector difference (S215). On the other hand, if the Y component is 0 (YES in S212), the Y component of the motion vector difference has already been successfully reconstructed, and thus decoding processing on the suffix portion of the Y component is skipped.

It should be noted that for the prefix portion, information of a motion vector difference has a high tendency (there tends to be many zero vectors), and thus coding efficiency increases by performing context adaptive binary arithmetic coding described above. Accordingly, context adaptive binary arithmetic decoding processing (FIG. 3) is executed at the time of decoding.

On the other hand, the suffix portion corresponds to lower bits of a large motion vector difference. Thus, the range of possible values is large (for example, 9 to 1024), and frequencies at which the same binary code string symbol occurs tend to be low. Accordingly, the amount of processing is reduced by performing bypass coding, assuming that the probability of symbol occurrence is 50%. Specifically, bypass decoding (FIG. 4) is executed when a suffix portion is decoded. It should be noted that if the sign of a motion vector difference is included, bypass coding is also performed on the sign, and thus bypass decoding is executed.

Figure 9:
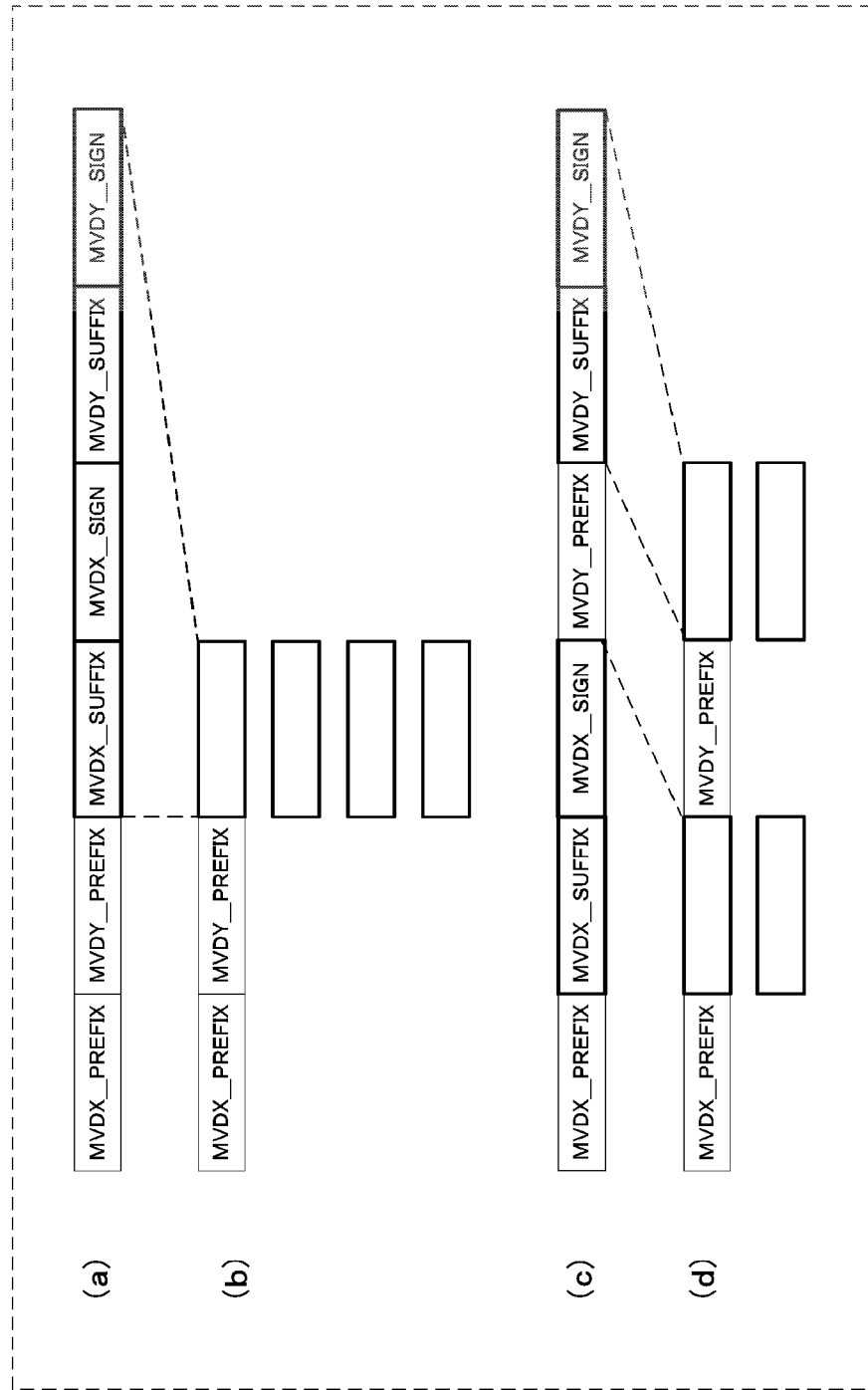
FIG. 9 is a diagram for describing examples of processing executed in Embodiment 1.

Here, an example of operation of decoding processing shown in FIG. 8 is described using FIG. 9.

FIG. 9 is a drawing for describing examples of steps of processing executed in Embodiment 1. In FIG. 9, (a) shows an example in the case where processing executed in Embodiment 1 is performed in parallel with one process. Processing is performed in the order of decoding on a prefix portion of an X component of a motion vector difference (MVDX_PREFIX), decoding on a prefix portion of a Y component thereof (MVDY_PREFIX), decoding on a suffix portion of the X component (MVDX_SUFFIX), decoding on the sign of the X component (MVDX_SIGN), decoding on the suffix portion of the Y component (MVDY_SUFFIX), and decoding on the sign of the Y component (MVDY_SIGN).

However, high-speed processing is required due to an increase in utilized image resolution and an expansion of high-speed real time communication, and thus parallelized processing is implemented. However, since context adaptive binary arithmetic coding processing is performed on a prefix portion, it is necessary to successively perform processing of reading and updating the probability of symbol occurrence. Thus, processing on a prefix portion cannot be parallelized. However, a bypass processing portion can be parallelized bitwise, as shown in (b) in FIG. 9.

In contrast, (c) and (d) in FIG. 9 are examples of parallelization of processing executed in the conventional configuration. In FIG. 9, (c) corresponds to (a) in FIGS. 9, and (d) in FIG. 9 corresponds to (b) in FIG. 9. Similarly, processing is successively performed on a prefix portion, namely, a context adaptive binary arithmetic decoding processing portion, and processing on a suffix portion, namely, bypass processing portion can be parallelized. However, since an X component and a Y component are alternately arranged, portions on which processing can be performed in parallel are not consecutively arranged. Thus, a sufficient increase in speed cannot be achieved ((d) in FIG. 9). Further, processing is often switched between context adaptive binary arithmetic decoding and bypass decoding, which results in a great load on and a considerable delay in processing.

Figure 10:
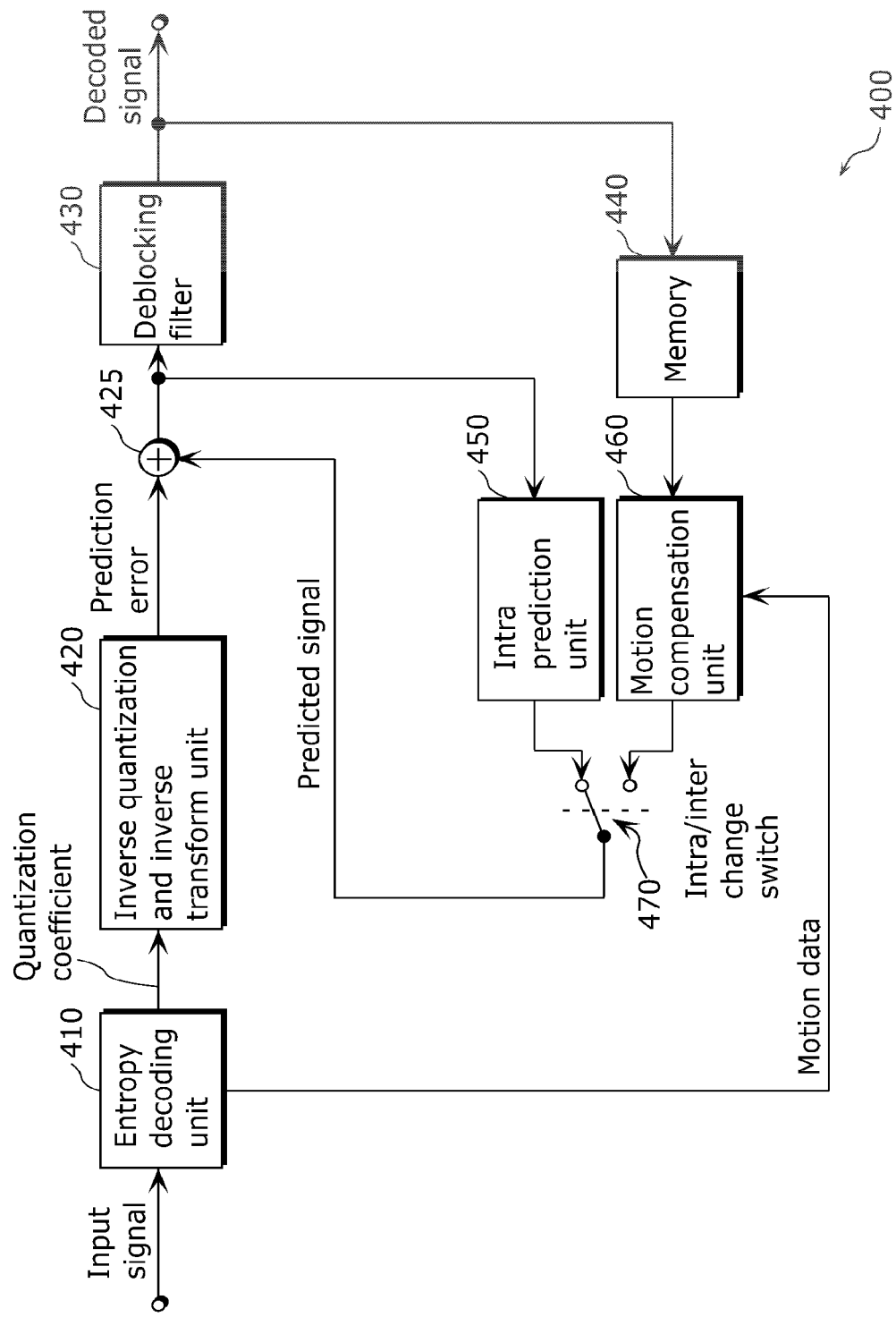
FIG. 10 is a block diagram showing an example of a configuration of an image decoding device according to Embodiment 1.

It should be noted that the arithmetic decoding unit 100 according to Embodiment 1 is included in the image decoding apparatus which decodes coded image data on which compression coding has been performed. FIG. 10 is a block diagram showing an example of a configuration of an image decoding apparatus 400 according to Embodiment 1.

The image decoding apparatus 400 decodes coded image data on which compression coding has been performed. For example, coded image data is input, on a block-by-block basis, to the image decoding apparatus 400 as signals to be decoded. The image decoding apparatus 400 reconstructs image data by performing variable length decoding, inverse quantization, and inverse transform on the input decoding target signals.

As shown in FIG. 10, the image decoding apparatus 400 includes an entropy decoding unit 410, an inverse quantization and inverse transform unit 420, an adder 425, a deblocking filter 430, a memory 440, an intra prediction unit 450, a motion compensation unit 460, and an intra/inter change switch 470.

The entropy decoding unit 410 performs variable length decoding on an input signal (input stream), to reconstruct a quantization coefficient. It should be noted that here, an input signal (input stream) is a signal to be decoded, and corresponds to coded image data for each block. Further, the entropy decoding unit 410 obtains motion data from the input signal, and outputs the obtained motion data to the motion compensation unit 460.

The inverse quantization and inverse transform unit 420 performs inverse quantization on the quantization coefficient reconstructed by the entropy decoding unit 410, to reconstruct a transform coefficient. Then, the inverse quantization and inverse transform unit 420 performs inverse transform on the reconstructed transform coefficient, to reconstruct a prediction error.

The adder 425 adds the reconstructed prediction error to a predicted signal, to generate a decoded image.

The deblocking filter 430 performs deblocking filter processing on the generated decoded image. The decoded image on which deblocking filter processing has been performed is output as a decoded signal.

The memory 440 is a memory for storing reference images used for motion compensation. Specifically, the memory 440 stores decoded images on which deblocking filter processing has been performed.

The intra prediction unit 450 performs intra prediction, to generate a predicted signal (intra-predicted signal). Specifically, the intra prediction unit 450 performs intra prediction by referring to an image around a block to be decoded (input signal) in the decoded image generated by the adder 425, to generate an intra-predicted signal.

The motion compensation unit 460 performs motion compensation, based on motion data output from the entropy decoding unit 410, to generate a predicted signal (inter-predicted signal).

The intra/inter change switch 470 selects either one of the intra-predicted signal and the inter-predicted signal, and outputs the selected signal to the adder 425 as a predicted signal.

Using the above configuration, the image decoding apparatus 400 according to Embodiment 1 decodes coded image data on which compression coding has been performed.

It should be noted that in the image decoding apparatus 400, the entropy decoding unit 410 includes the motion vector difference decoding unit 100 according to Embodiment 1.

As described above, the image decoding apparatus and the image decoding method according to Embodiment 1 enable high-speed motion vector difference decoding.

Specifically, as described in Embodiment 1, an X component and a Y component of a motion vector difference value are integrated, and a motion vector difference value is separated into a portion on which context adaptive binary arithmetic decoding is to be performed and a portion on which bypass processing is to be performed. Consequently, it is possible to expand a portion on which parallel operation can be performed. Thus, parallel processing, or in other words, high-speed decoding can be performed.

It should be noted that although the above describes decoding processing on a suffix portion and sign decoding processing, which are performed on an X component and a Y component separately, the inventive concept is not limited to this. For example, after suffix portion decoding processing on an X component, suffix portion decoding processing on a Y component, sign decoding processing on an X component, and then sign decoding processing on a Y component may be performed. Even with this configuration, portions on which bypass processing is performed are in succession, and thus advantageous effects can be expected to be obtained. Also, with respect to a prefix portion, information indicating whether an X component is 0, and information indicating whether a Y component is 0 may be decoded in succession. The same restrictions on a portion on which context arithmetic decoding processing is performed (processing needs to be successively performed) are applied to either case.

It should be noted that a binary string shown in FIG. 6 and the length of a portion on which context adaptive binary arithmetic decoding is performed are examples, and do not necessarily need to be the same as in the above description. For example, decoding may be performed assuming that a motion vector difference whose absolute value is 0, 1, or 2 is a prefix portion, whereas a motion vector difference whose absolute value is greater than or equal to 3 is a suffix portion (as a matter of course, the coding apparatus which generates this bit stream is assumed to have also performed the same processing). By determining a binary string in this way, the degree of parallelism can be increased, and decoding processing can be performed at a still higher speed.

Modification of Embodiment 1

It should be noted that in Embodiment 1, a motion vector difference is separated into a prefix portion corresponding to a portion on which context adaptive binary arithmetic decoding processing is performed and a suffix portion corresponding to a portion on which bypass decoding processing is performed, irrespective of an X component and a Y component. This achieves high-speed processing. While achieving this point, it is possible to consider a modification as will be described below.

Figure 11:
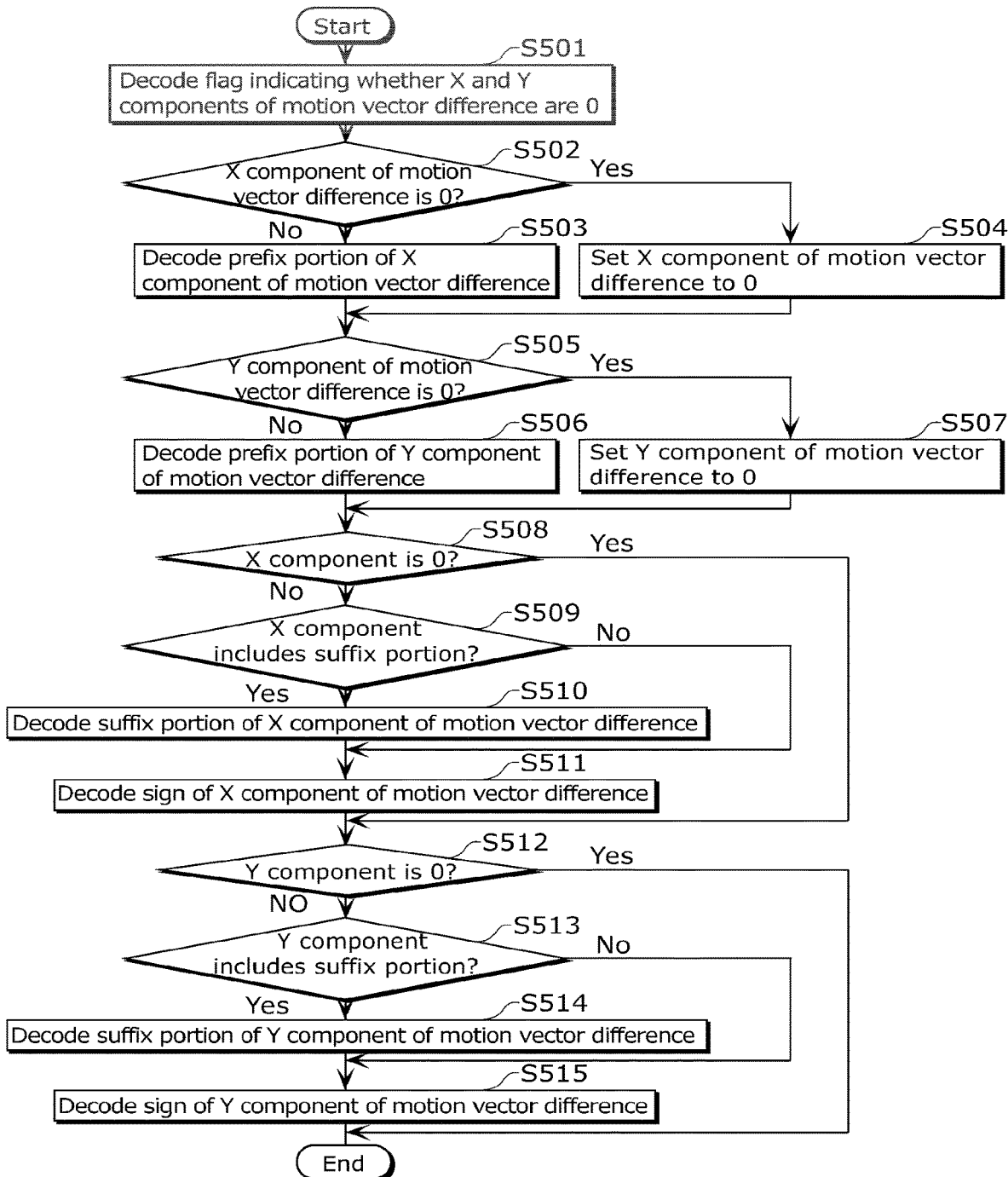
FIG. 11A is a table showing examples of binary code strings according to a modification of Embodiment 1.
FIG. 11B is a flowchart showing processing operation of a decoding apparatus according to the modification of Embodiment 1.

The modification of Embodiment 1 is now described in detail using FIGS. 11A and 11B. FIG. 11A is a flag correspondence table showing whether X components and Y components of motion vector differences are 0 in the modification of Embodiment 1. FIG. 11B is a flowchart showing an example of the flow of processing in the modification of Embodiment 1.

Embodiment 1 describes different flags indicating whether an X component of a motion vector difference is 0 and whether a Y component of a motion vector difference is 0. However, an X component and a Y component of a motion vector difference are combined to perform decoding in Embodiment 1, and thus coding efficiency can be further improved by combining the flags.

For example, as shown in FIG. 11A, codes (MVDXY_EXIST) are assigned to combinations showing whether an X component is 0 (MVDX_EXIST) and whether a Y component is 0 (MVDY_EXIST).

"0" is assigned if both of an X component and a Y component are 0, "111" is assigned if neither an X component nor a Y component is 0, "110" is assigned if an X component is 0, whereas a Y component is not 0, and "10" is assigned if a Y component is 0, whereas an X component is not 0.

As described above, it is considered to designate, using an index, a method of performing derivation from neighboring vectors, as a method of deriving a motion vector difference. Accordingly, a probability that a component of a motion vector difference is "0" is even higher than conventional image coding. If both of an X component and a Y component are "0", a binary string signal can be expressed using 1 bit in the present modification, although conventionally 2 bits are necessary. The flow of processing performed by the motion vector difference decoding unit 100 in the present modification is as shown in FIG. 11B.

In step S501, a code string which indicates whether an X component and a Y component of a motion vector difference are 0 is obtained (S501). Here, for example, the correspondence table in FIG. 11A is applied to a result showing whether an X component and a Y component are 0. It should be noted that FIG. 11B is the same as FIG. 8 except for that steps S200 and S204 in FIG. 8 are replaced with step S501, and thus a description of the following steps is omitted.

It should be noted that the correspondence table shown in FIG. 11A is an example. In the case of this example, binary strings are determined, assuming that a possibility of an X component of a motion vector difference being 0 is low since generally many images horizontally move. For example, a motion vector difference coding unit may switch such correspondence tables from one to another according to the code occurrence frequency, and may record an index indicating which correspondence table is used for coding in a bit stream. Thereafter, the motion vector difference decoding unit 100 may obtain the correspondence table in FIG. 11A by decoding the index.

This modification enables coding efficiency to be improved while achieving high-speed processing.

Embodiment 2

The outline of an arithmetic coding method in the present embodiment is now described. The arithmetic coding method in the present embodiment has a feature of dividing a motion vector difference into a prefix portion corresponding to a portion on which context adaptive binary arithmetic coding is performed and a suffix portion corresponding to a portion on which bypass processing coding is performed, rather than dividing a motion vector difference into an X component and a Y component. This achieves parallelization of processing and high-speed coding.

The above is a description of the outline of the arithmetic coding method in the present embodiment. The same method as the conventional arithmetic coding method may be used, unless particularly described.

Next is a description of the flow of processing performed by the motion vector difference coding unit which carries out the motion vector difference coding method in the present embodiment.

Figure 12:
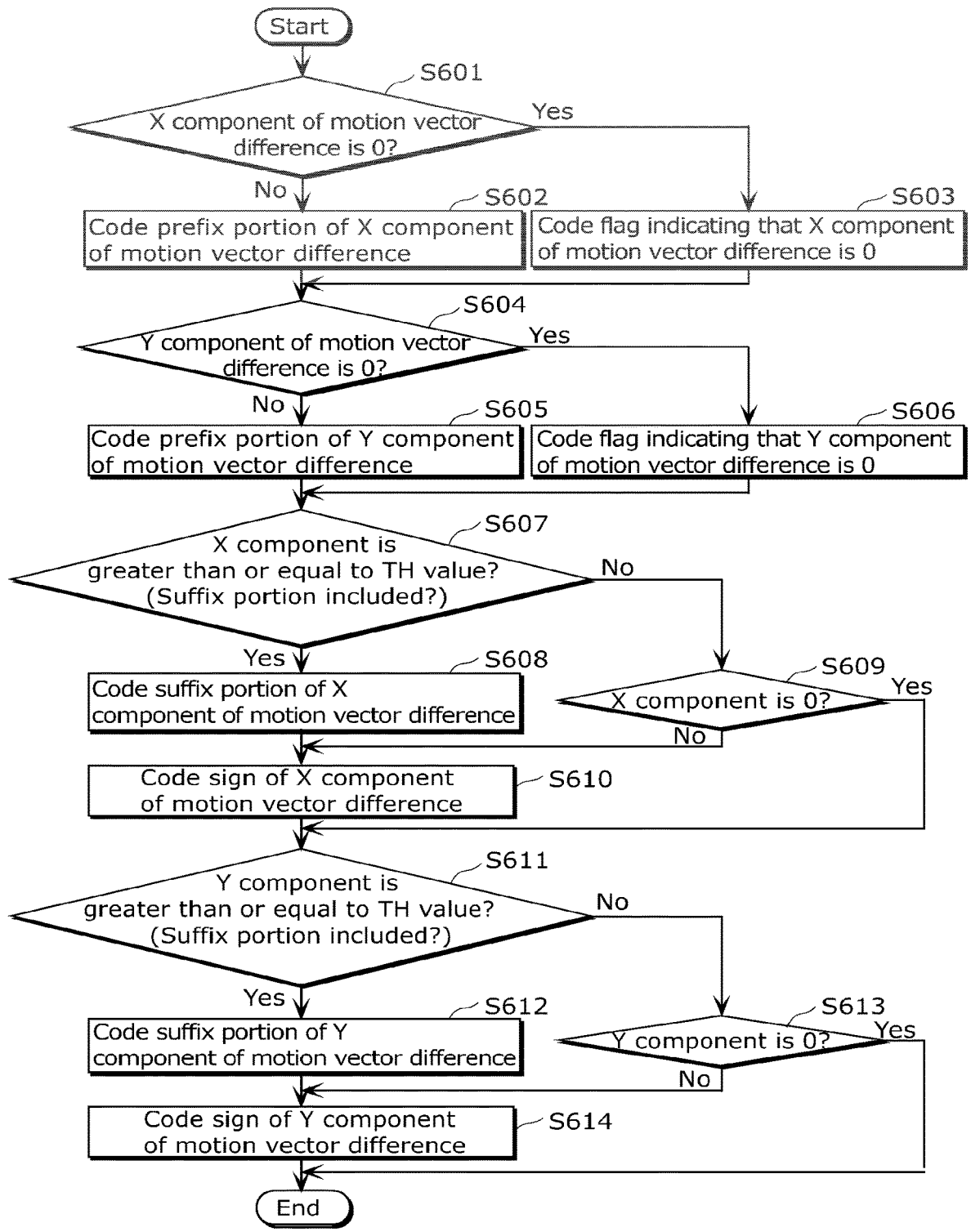
FIG. 12 is a flowchart showing processing operation of a coding apparatus according to Embodiment 2.

FIG. 12 is a flowchart showing the flow of processing performed by a motion vector difference coding unit according to Embodiment 2.

First, the motion vector difference coding unit obtains information on an X component and a Y component of a motion vector difference to be coded, and determines whether the X component of the motion vector difference is 0 (S601). If the X component of the motion vector difference is not 0 (NO in S601), coding processing is performed on a prefix portion of the X component of the motion vector difference (S602). It should be noted that in the coding processing on the prefix portion here, a binary string shown in FIG. 6 is coded using the context adaptive binary arithmetic coding method described below. The context adaptive binary arithmetic coding forms a pair with the arithmetic decoding method in FIG. 3, and is a kind of arithmetic coding in which contexts are switched from one to another based on conditions, the probability of symbol occurrence is obtained, and the probability value thereof is updated using the coded symbol (see NPL 1). It should be noted that in the following, the context adaptive binary arithmetic coding method is applied for coding a prefix portion, if not written clearly.

Next, if the X component of the motion vector difference is 0 (YES in S601), a flag is coded which indicates that the X component of the motion vector difference is 0 (S603). Next, it is determined whether the Y component of the motion vector difference is 0 (S604). If the Y component of the motion vector difference is not 0 (NO in S604), coding processing is performed on the prefix portion of the Y component of the motion vector difference (in the same manner as that for the X component, S605). On the other hand, if the Y component of the motion vector difference is 0, a flag is coded which indicates that the Y component of the motion vector difference is 0 (S606).

Next, it is determined whether the X component of the motion vector difference is greater than or equal to a TH value, or in other words, a suffix is included (S607). For example, if the binary string table in FIG. 6 is used, determination is made assuming that TH=9. It should be noted that in the present embodiment, a boundary between a prefix (context adaptive binary arithmetic coding) portion and a suffix (bypass processing coding) portion may be determined, irrespective of this binary string table.

If the X component includes a suffix portion here (YES in S607), the suffix portion of the X component of the motion vector difference is coded (S608). It should be noted that arithmetic coding bypass processing is performed for coding a suffix portion. Specifically, it is a method used to reduce calculation by fixing the probability to 50%, and forms a pair with the bypass decoding method shown in FIG. 4 (see NPL 1). In the following, bypass coding is used for coding a suffix portion, if not clearly written. Next, the sign of the X component of the motion vector difference is coded. It should be noted that bypass coding is also performed with respect to this processing (S610). It should be noted that the sign of the X component is coded also in the case where a suffix portion is not included (NO in S607), and the X component is not 0 (NO in S609). After the end of suffix coding processing on the X component (S610 and YES in S609), suffix coding processing is performed on the Y component.

Next, it is determined whether the Y component of the motion vector difference is greater than or equal to the TH value, or in other words, a suffix is included (S611). Since it is determined in the same manner as that for the X component, a detailed description is omitted.

If the Y component includes a suffix portion here (YES in S611), the suffix portion of the Y component of the motion vector difference is coded (S612). It should be noted that arithmetic coding bypass processing is performed for coding a suffix portion. Next, the sign of the Y component of the motion vector difference is coded. It should be noted that bypass coding is also performed with respect to this processing (S614). It should be noted that the sign of the Y component is also coded if the suffix portion is not included (NO in S611), and the Y component is not 0 (NO in S613). This completes suffix coding processing on the Y component, and coding processing on the X component and the Y component of the motion vector difference ends.

It should be noted that even using the method for coding a motion vector difference, processing can be parallelized as in (b) in FIG. 9 described in Embodiment 1, and thus a high-speed coding apparatus can be obtained. It should be noted that as a coding method for the modification of Embodiment 1, S601 and S604 in the processing flow in FIG. 12 are performed first. Then, instead of S603 and S606, a binary string is coded which indicates whether each of an X component and a Y component in a combination is 0, based on the correspondence table of FIG. 11A. It should be noted that prefix coding, namely, the context adaptive binary arithmetic coding method is also performed for coding in this case. This achieves a high-speed coding apparatus, while improving coding efficiency.

It should be noted that FIG. 13 is a schematic diagram for describing syntax which shows an example of a data structure of this configuration. It should be noted that this syntax table is quoted from NPL 2, and is an example of a data structure in which the portions denoted by 701, 702, and 703 are generated using the method for coding (decoding) a motion vector difference in Embodiment 2 (and Embodiment 1).

As shown by 701 to 703, mvd_I? which indicates a motion vector difference is represented as a parameter which indicates both of an x component and a y component. It should be noted that "?" in mvd_I? corresponds to a reference index, and is specifically c, 0, or 1 (see NPL 2 for details).

A motion vector difference is conventionally represented as mvd_I? [x0] [y0] [0] and mvd_I? [x0] [y0] [1]. Here, the last element [0] indicates an X component, and the last element [1] indicates a Y component. An X component and a Y component of a motion vector difference according to Embodiment 2 (and Embodiment 1) are combined and described in a stream. Accordingly, a motion vector difference according to Embodiment 2 (and Embodiment 1) is notated as mvd_I? [x0] [y0].

High-speed coding and high-speed decoding can be achieved by generating data having such a structure.

Figure 14:
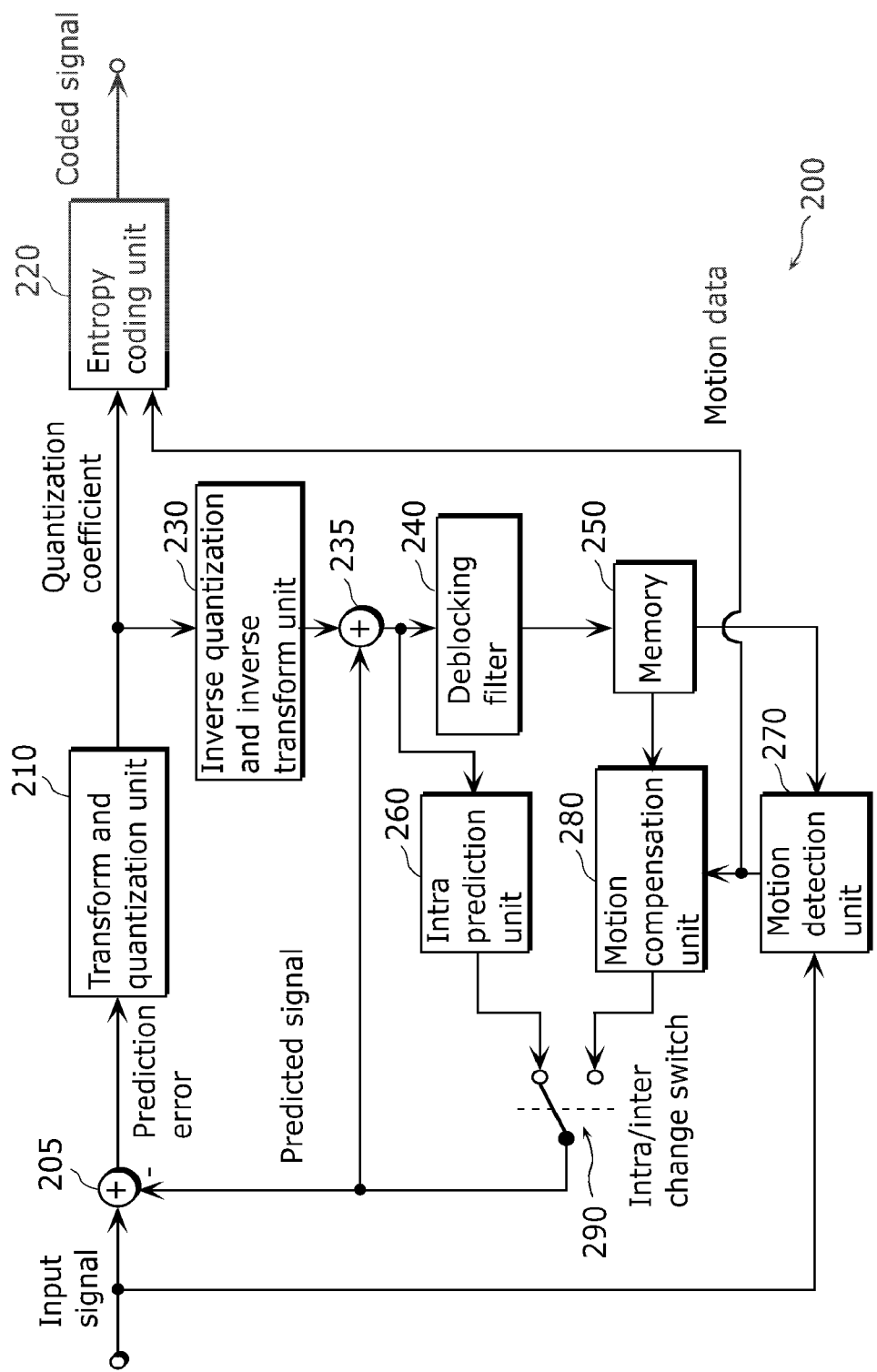
FIG. 14 is a block diagram showing an example of a configuration of an image coding apparatus according to Embodiment 2.

It should be noted that the motion vector difference coding unit according to Embodiment 2 is included in the image coding apparatus which performs compression coding on image data. FIG. 14 is a block diagram showing an example of a configuration of an image coding apparatus 200 according to Embodiment 2.

The image coding apparatus 200 performs compression coding on image data. For example, image data is input to the image coding apparatus 200 as an input signal for each block. The image coding apparatus 200 performs transform, quantization, and variable length coding on the input signal which has been input, to generate a coded signal.

As shown in FIG. 14, the image coding apparatus 200 includes a subtractor 205, and a transform and quantization unit 210, an entropy coding unit 220, an inverse quantization and inverse transform unit 230, an adder 235, a deblocking filter 240, a memory 250, an intra prediction unit 260, a motion detection unit 270, a motion compensation unit 280, and an intra/inter change switch 290.

The subtractor 205 calculates a difference between an input signal and a predicted signal, or in other words, a prediction error.

The transform and quantization unit 210 transforms a prediction error in a spatial domain to generate a transform coefficient in a frequency domain. For example, the transform and quantization unit 210 performs discrete cosine transform (DCT) on the prediction error, to generate a transform coefficient. Furthermore, the transform and quantization unit 210 quantizes the transform coefficient, to generate a quantization coefficient.

The entropy coding unit 220 performs variable length coding on the quantization coefficient, to generate a coded signal. Further, the entropy coding unit 220 codes motion data (for example, motion vector) detected by the motion detection unit 270, and outputs the data included in the coded signal.

The inverse quantization and inverse transform unit 230 performs inverse quantization on the quantization coefficient, to reconstruct a transform coefficient. Furthermore, the inverse quantization and inverse transform unit 230 performs inverse transform on the reconstructed transform coefficient, to reconstruct the prediction error. It should be noted that the reconstructed prediction error has information loss due to quantization, and thus does not match the prediction error generated by the subtractor 205. Specifically, the reconstructed prediction error includes a quantization error.

The adder 235 adds the reconstructed prediction error to the predicted signal, to generate a local decoded image.

The deblocking filter 240 performs deblocking filter processing on the generated local decoded image.

The memory 250 is a memory for storing reference images used for motion compensation. Specifically, the memory 250 stores the locally decoded image on which deblocking filter processing has been performed.

The intra prediction unit 260 performs intra prediction, to generate a predicted signal (intra-predicted signal). Specifically, the intra prediction unit 260 performs intra prediction by referring to an image around a coding target block (input signal) in the locally decoded image generated by the adder 235, to generate an intra-predicted signal.

The motion detection unit 270 detects motion data (for example, motion vector) between an input signal and a reference image stored in the memory 250.

The motion compensation unit 280 performs motion compensation, based on the detected motion data, to generate a predicted signal (inter-predicted signal).

The intra/inter change switch 290 selects either one of an intra-predicted signal and an inter-predicted signal, and outputs the selected signal as a predicted signal to the subtractor 205 and the adder 235.

Using the above configuration, the image coding apparatus 200 according to Embodiment 2 performs compression coding on image data.

Embodiment 3

The present embodiment describes characteristic configurations and procedures included in Embodiment 1 or 2 for confirmation. The configurations and the procedures according to the present embodiment correspond to the configurations and procedures described in Embodiment 1 or 2. Specifically, the concept described in Embodiments 1 and 2 include the configurations and the procedures according to the present embodiment.

Figure 15A:
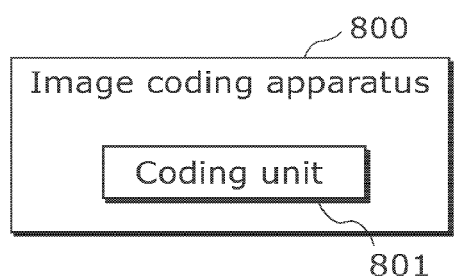
FIG. 15A is a block diagram showing an example of a configuration of an image coding apparatus according to Embodiment 3.

FIG. 15A is a block diagram showing an example of a configuration of an image coding apparatus according to the present embodiment. An image coding apparatus 800 shown in FIG. 15A codes an image using a motion vector. The image coding apparatus 800 includes a coding unit 801.

Figure 15B:
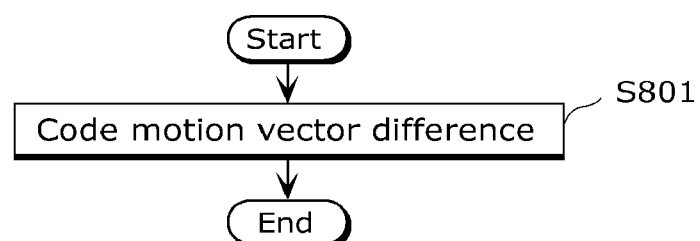
FIG. 15B is a flowchart showing processing operation of the image coding apparatus according to Embodiment 3.

FIG. 15B is a flowchart showing processing operation of the image coding apparatus 800 shown in FIG. 15A. The coding unit 801 codes a motion vector difference (S801). A motion vector difference shows the difference between a predicted motion vector and a motion vector. A predicted motion vector is a predicted value of a motion vector. When coding a motion vector difference, the coding unit 801 codes a first portion, a second portion, a third portion, and a fourth portion.

The first portion is a part of a first component which is one of a horizontal component and a vertical component of a motion vector difference. The second portion is a part of a second component which is different from the first component and is the other one of the horizontal component and the vertical component of the motion vector difference. The third portion is a part of the first component, and is different from the first portion. The fourth portion is a part of the second component, and is different from the second portion. Typically, a part of each component is a part of binary data corresponding to the component.

Then, the coding unit 801 generates a code string which includes the first portion, the second portion, the third portion, and the fourth portion in the order of the first portion, the second portion, the third portion, and the fourth portion.

Accordingly, a part of the horizontal component of the motion vector difference and a part of the vertical component of the motion vector difference are combined in the code string. Thus, the motion vector difference is efficiently coded by combining a part of the horizontal component and a part of the vertical component.

For example, the first portion may include a flag indicating whether the first component is 0. The second portion may include a flag indicating whether the second component is 0. The third portion may include the sign of the first component. The fourth portion may include the sign of the second component.

Further, for example, if the absolute value of the first component is greater than a threshold value, the third portion may include the difference between the threshold value and the absolute value of the first component. If the absolute value of the second component is greater than the threshold value, the fourth portion may include the difference between the threshold value and the absolute value of the second component.

Further, for example, the coding unit 801 may code the first portion and the second portion by performing context adaptive binary arithmetic coding. Then, the coding unit 801 may code the third portion and the fourth portion by performing bypass coding. Context adaptive binary arithmetic coding is arithmetic coding in which a variable probability updated based on coded data is used. Bypass coding is arithmetic coding in which a predetermined fixed probability is used. Further, the coding unit 801 may code the third portion and the fourth portion in parallel.

Further, for example, the coding unit 801 may code the first portion, the second portion, the third portion, and the fourth portion in the order of the first portion, the second portion, the third portion, and the fourth portion.

For example, the coding unit 801 may switch coding processing to first coding processing conforming to a first standard or to second coding processing conforming to a second standard. Then, the coding unit 801 may generate a bit stream which includes identification information indicating the first standard or the second standard to which a corresponding one of the first coding processing and the second coding processing to which the coding processing has been switched conforms.

If coding processing is switched to the first coding processing, the coding unit 801 may generate a code string which includes the first portion, the second portion, the third portion, and the fourth portion in the order of the first portion, the second portion, the third portion, and the fourth portion. In addition, the coding unit 801 may generate a bit stream which includes identification information indicating the first standard and the code string, in this case.

Figure 16A:
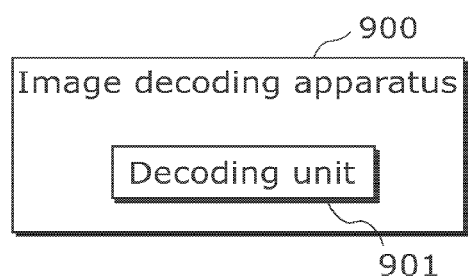
FIG. 16A is a block diagram showing an example of a configuration of an image decoding apparatus according to Embodiment 3.

FIG. 16A is a block diagram showing an example of a configuration of an image decoding apparatus according to the present embodiment. An image decoding apparatus 900 shown in FIG. 16A decodes an image using a motion vector. Further, the image decoding apparatus 900 includes a decoding unit 901.

Figure 16B:
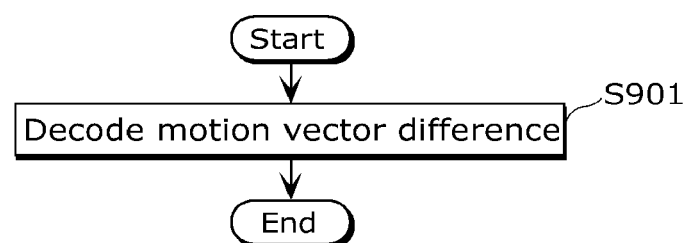
FIG. 16B is a flowchart showing processing operation of the image decoding apparatus according to Embodiment 3.

FIG. 16B is a flowchart showing processing operation of the image decoding apparatus 900 shown in FIG. 16A. The decoding unit 901 decodes a motion vector difference (S901). A predicted motion vector is a predicted value of a motion vector. A motion vector difference shows the difference between the predicted motion vector and the motion vector.

When decoding a motion vector difference, the decoding unit 901 obtains a code string. Then, the decoding unit 901 decodes a first portion included in the code string, decodes a second portion included in the code string, decodes a third portion included in the code string, and decodes a fourth portion included in the code string.

The first portion is a part of a first component which is one of a horizontal component and a vertical component of a motion vector difference. The second portion is a part of a second component which is different from the first component and is the other one of the horizontal component and the vertical component. The third portion is a part of the first component, and is different from the first portion. The fourth portion is a part of the second component, and is different from the second portion. Typically, a part of each component is a part of binary data corresponding to the component.

A code string includes the first portion, the second portion, the third portion, and the fourth portion in the order of the first portion, the second portion, the third portion, and the fourth portion.

Accordingly, the decoding unit 901 obtains a code string in which a part of the horizontal component of the motion vector difference and a part of the vertical component of the motion vector difference are combined. Then, the motion vector difference is efficiently decoded by using a code string in which a part of the horizontal component and a part of the vertical component are combined.

For example, the first portion may include a flag which indicates whether the first component is 0. The second portion may include a flag which indicates whether the second component is 0. The third portion may include the sign of the first component. The fourth portion may include the sign of the second component.

For example, if the absolute value of the first component is greater than a threshold value, the third portion may include the difference between the threshold value and the absolute value of the first component. If the absolute value of the second component is greater than the threshold value, the fourth portion may include the difference between the threshold value and the absolute value of the second component.

For example, the decoding unit 901 may decode the first portion and the second portion by performing context adaptive binary arithmetic decoding. Further, the decoding unit 901 may decode the third portion and the fourth portion by performing bypass decoding. Context adaptive binary arithmetic decoding is arithmetic decoding in which a variable probability updated based on decoded data is used. Bypass decoding is arithmetic decoding in which a predetermined fixed probability is used. In addition, the decoding unit 901 may decode the third portion and the fourth portion in parallel.

For example, the decoding unit 901 may decode the first portion, the second portion, the third portion, and the fourth portion in the order of the first portion, the second portion, the third portion, and the fourth portion.

Further, for example, the decoding unit 901 may obtain a bit stream which includes identification information indicating a first standard or a second standard. Then, based on the identification information, the decoding unit 901 may switch decoding processing to first decoding processing conforming to the first standard or to second decoding processing conforming to the second standard.

If decoding processing is switched to the first decoding processing, the decoding unit 901 may obtain, from the bit stream, the code string which includes the first portion, the second portion, the third portion, and the fourth portion in the order of the first portion, the second portion, the third portion, and the fourth portion.

Further, for example, the image coding apparatus 800 and the image decoding apparatus 900 may constitute an image coding and decoding apparatus.

Further, for example, the data structure corresponding to a code string of a motion vector difference may be the data structure shown in FIG. 17.

FIG. 17 shows a syntax table showing an example of a data structure corresponding to a code string of a motion vector difference. In FIG. 17, [0] indicates a horizontal component, whereas [1] indicates a vertical component.

"abs_mvd_greater0_flag" is a flag which indicates whether the absolute value of a horizontal component or a vertical component of a motion vector difference is greater than 0. "abs_mvd_greater1_flag" is a flag which indicates whether the absolute value of the horizontal component or the vertical component of the motion vector difference is greater than 1. "abs_mvd_minus2" is a value obtained by subtracting 2 from the absolute value of the horizontal component or the vertical component of the motion vector difference. "mvd_sign_flag" is a sign of the horizontal component or the vertical component of the motion vector difference.

"abs_mvd_greater0_flag" and "abs_mvd_greater1_flag" correspond to a prefix portion. "abs_mvd_minus2" corresponds to a suffix portion. Typically, context adaptive binary arithmetic coding (decoding) is used for coding (decoding) "abs_mvd_greater0_flag" and "abs_mvd_greater1_flag". Then, bypass coding (decoding) is used for coding (decoding) "abs_mvd_minus2" and "mvd_sign_flag".

It should be noted that in the above embodiments, each of the constituent elements may be constituted by dedicated hardware, or may be obtained by executing a software program suitable for the constituent element. Each constituent element may be obtained by a program execution unit such as a CPU or a processor reading and executing a software program recorded on a recording medium such as a hard disk or semiconductor memory. Here, the software which realizes the image coding apparatus in the above embodiments and the like is a program as will be described below.

Specifically, this program causes a computer to execute an image coding method for coding an image using a motion vector, the method including coding a motion vector difference indicating a difference between the motion vector and a predicted motion vector which is a predicted value of the motion vector, wherein the coding includes: coding a first portion that is a part of a first component which is one of a horizontal component and a vertical component of the motion vector difference; coding a second portion that is a part of a second component which is different from the first component and is the other one of the horizontal component and the vertical component; coding a third portion that is a part of the first component and is different from the first portion; coding a fourth portion that is a part of the second component and is different from the second portion; and generating a code string which includes the first portion, the second portion, the third portion, and the fourth portion in an order of the first portion, the second portion, the third portion, and the fourth portion.

The above is a description of an image coding method according to one or more aspects of the inventive concept, the scope of which is defined in the appended Claims and their equivalents, based on some exemplary embodiments. However, the inventive concept is not limited to these exemplary embodiments. Those skilled in the art will readily appreciate that it is possible to make various modifications in these exemplary embodiments and to arbitrarily combine the constituent elements in the exemplary embodiments without materially departing from the principles and spirit of the inventive concept.

Embodiment 4

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

FIG. 18 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 18, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 19:
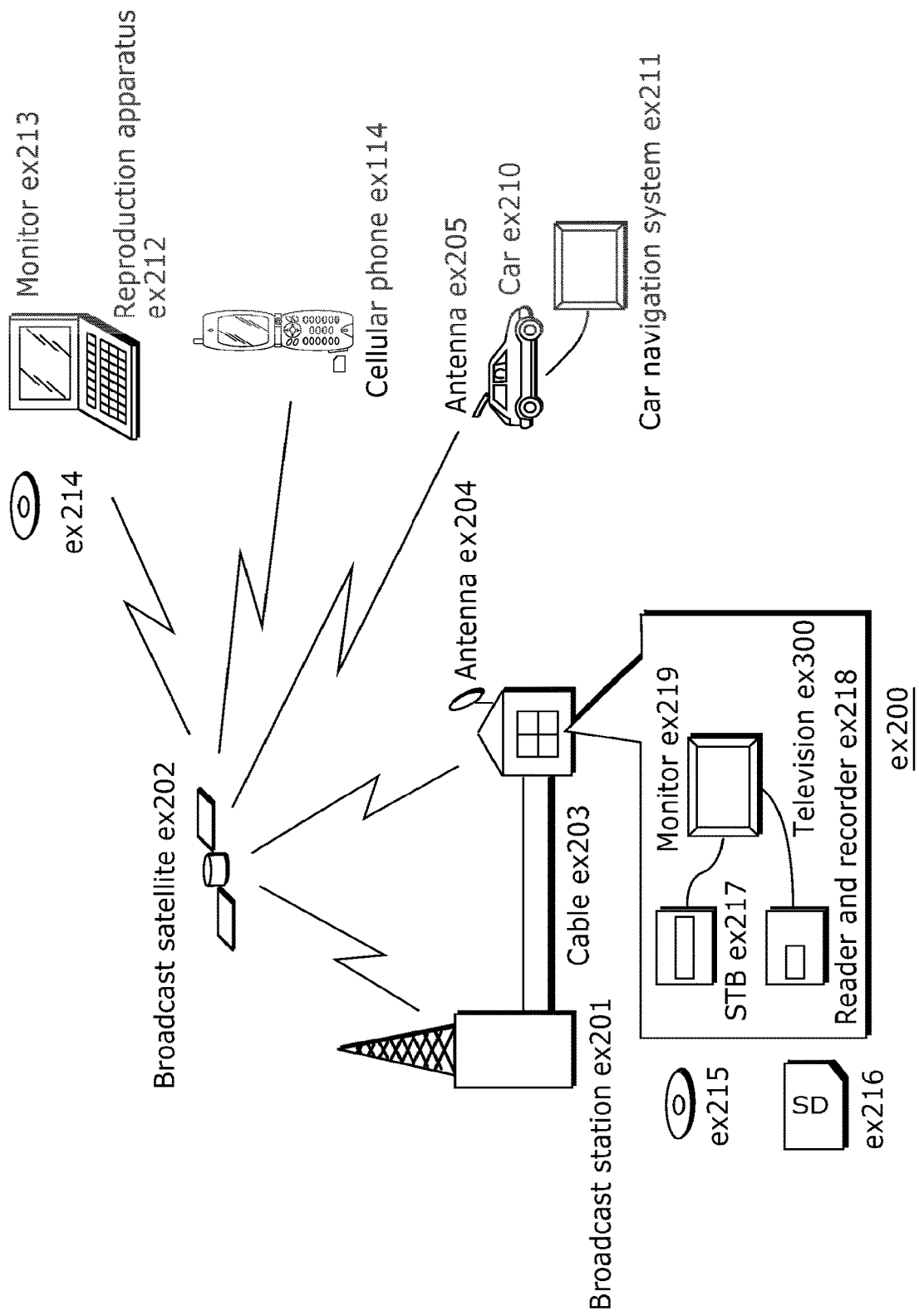
FIG. 19 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 19. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 20:
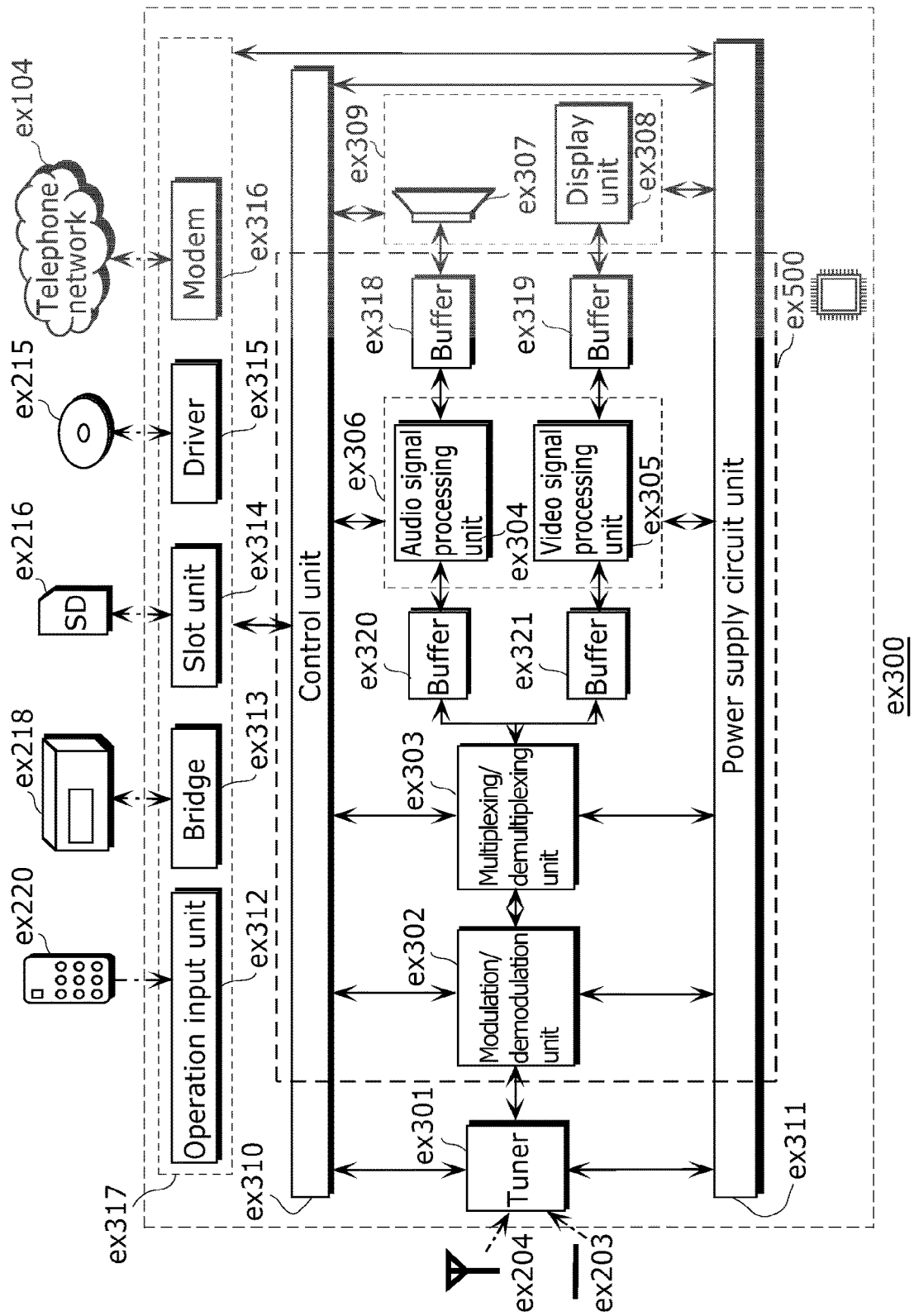
FIG. 20 shows a block diagram illustrating an example of a configuration of a television.

FIG. 20 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 21:
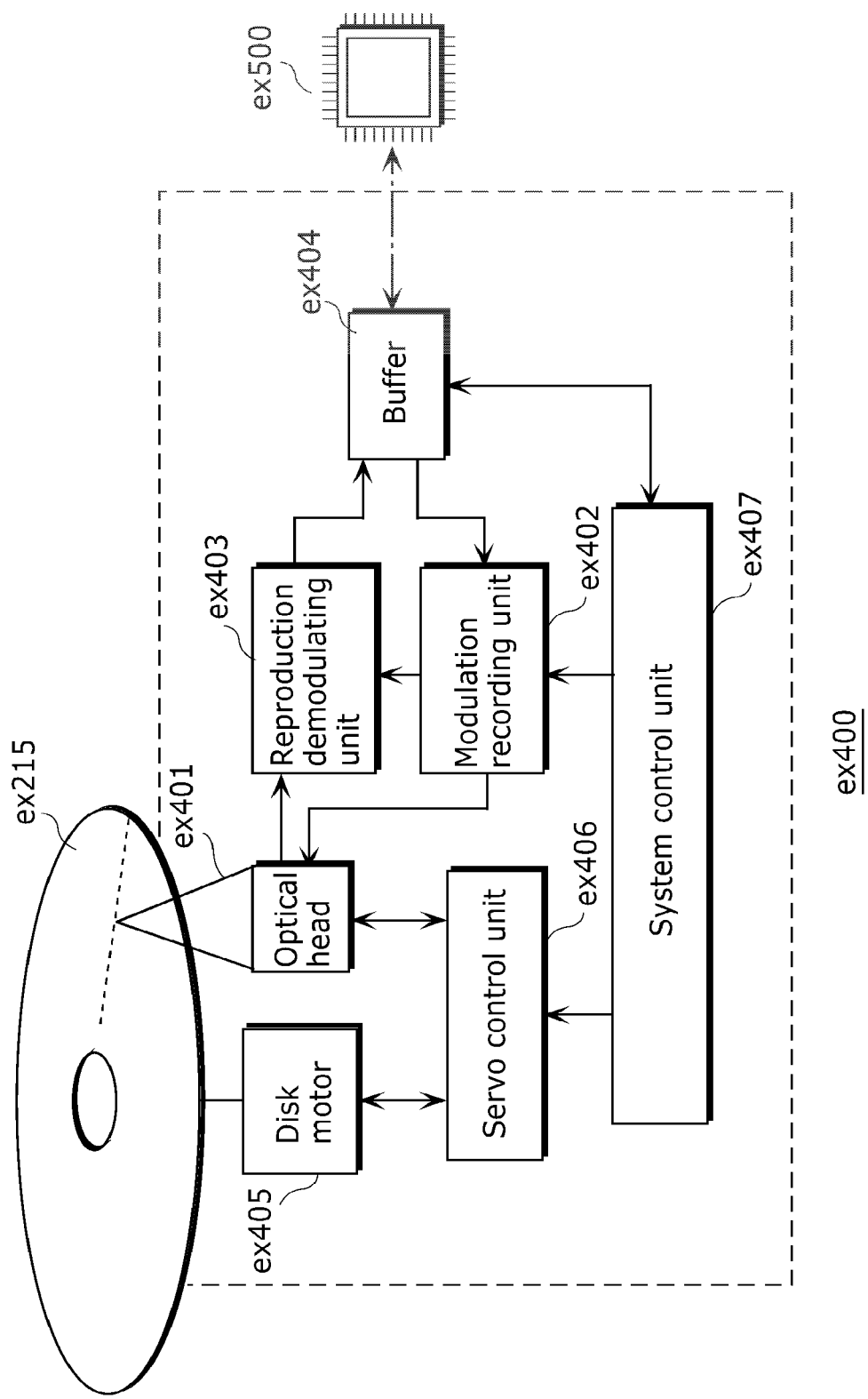
FIG. 21 shows a block diagram illustrating an example of a configuration of an information reproducing/recording unit that reads and writes information from and on a recording medium that is an optical disk.

As an example, FIG. 21 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 22:
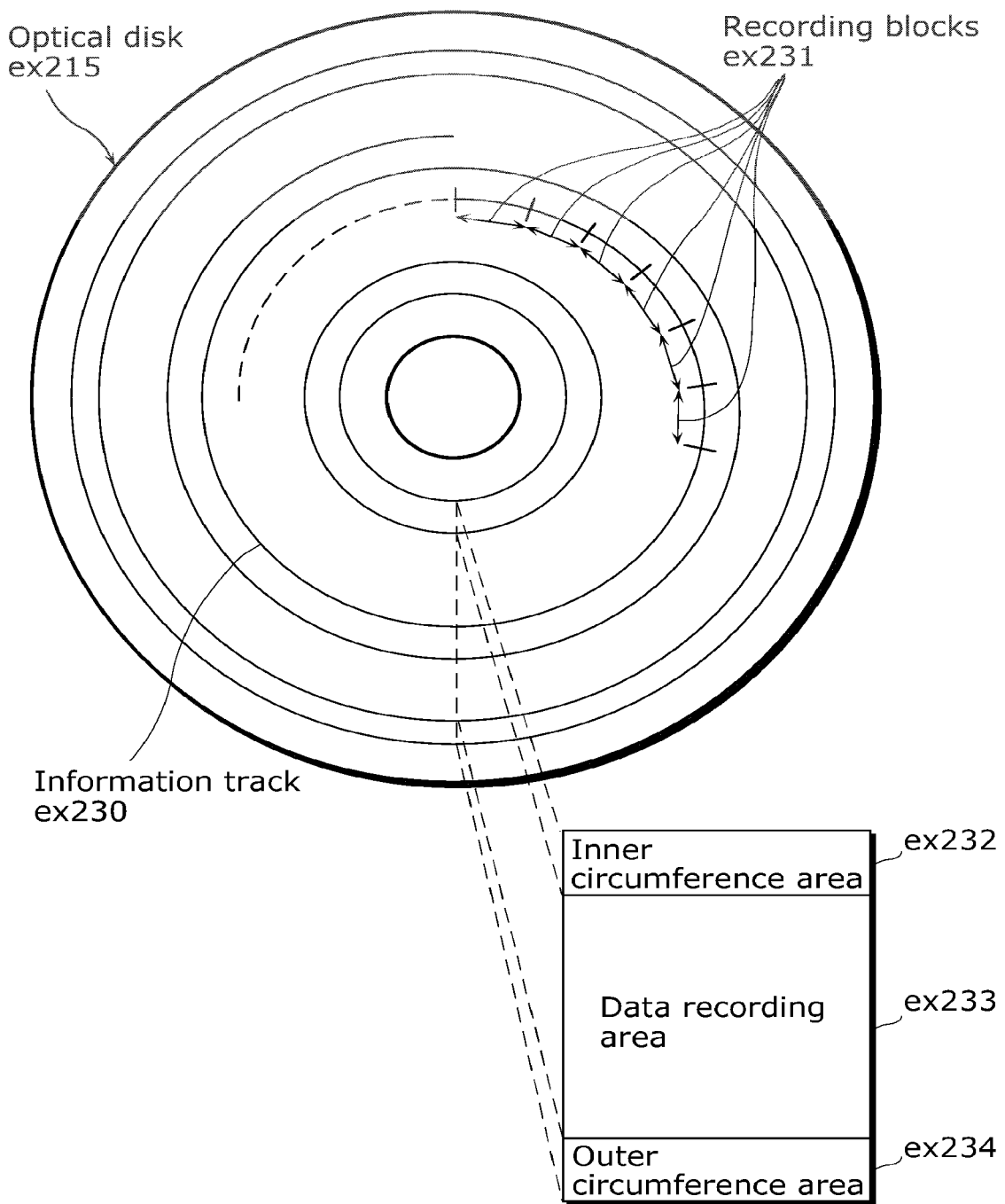
FIG. 22 shows an example of a configuration of a recording medium that is an optical disk.

FIG. 22 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 20. The same will be true for the configuration of the computer ex111, the cellular phone ex114, and others.

Figure 23A:
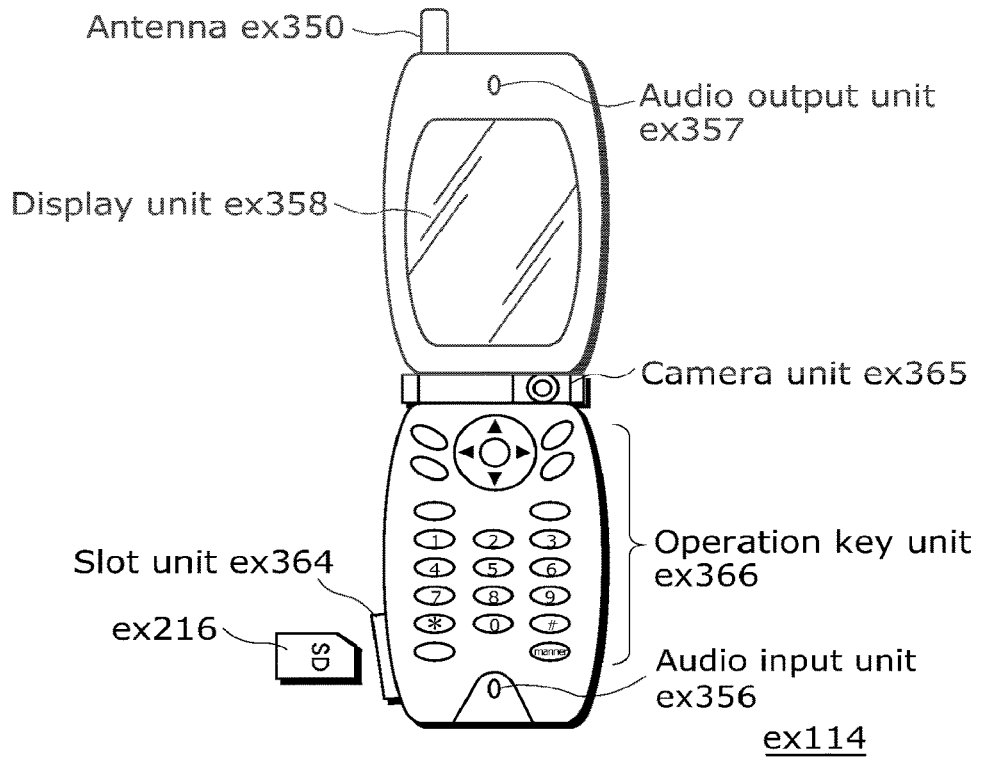
FIG. 23A shows an example of a cellular phone.

FIG. 23A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 23B:
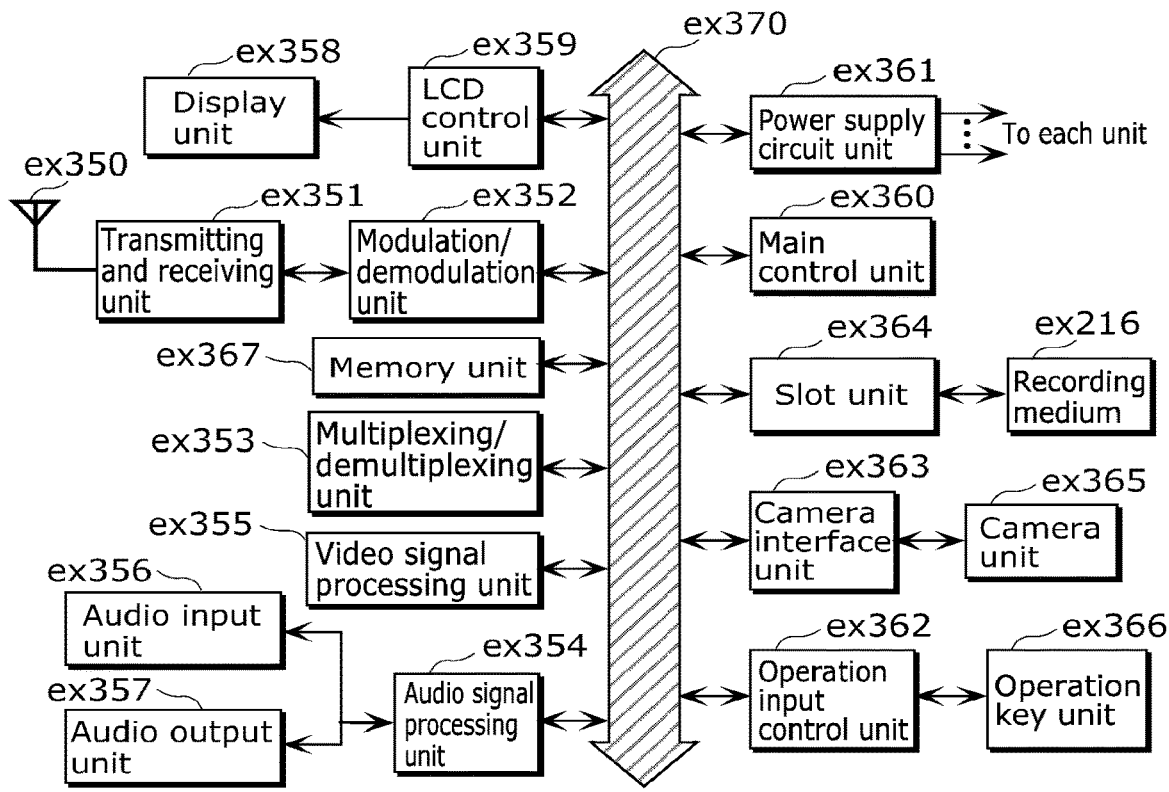
FIG. 23B is a block diagram showing an example of a configuration of a cellular phone.

Next, an example of a configuration of the cellular phone ex114 will be described with reference to FIG. 23B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 5

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 24 illustrates a structure of the multiplexed data. As illustrated in FIG. 24, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 25:
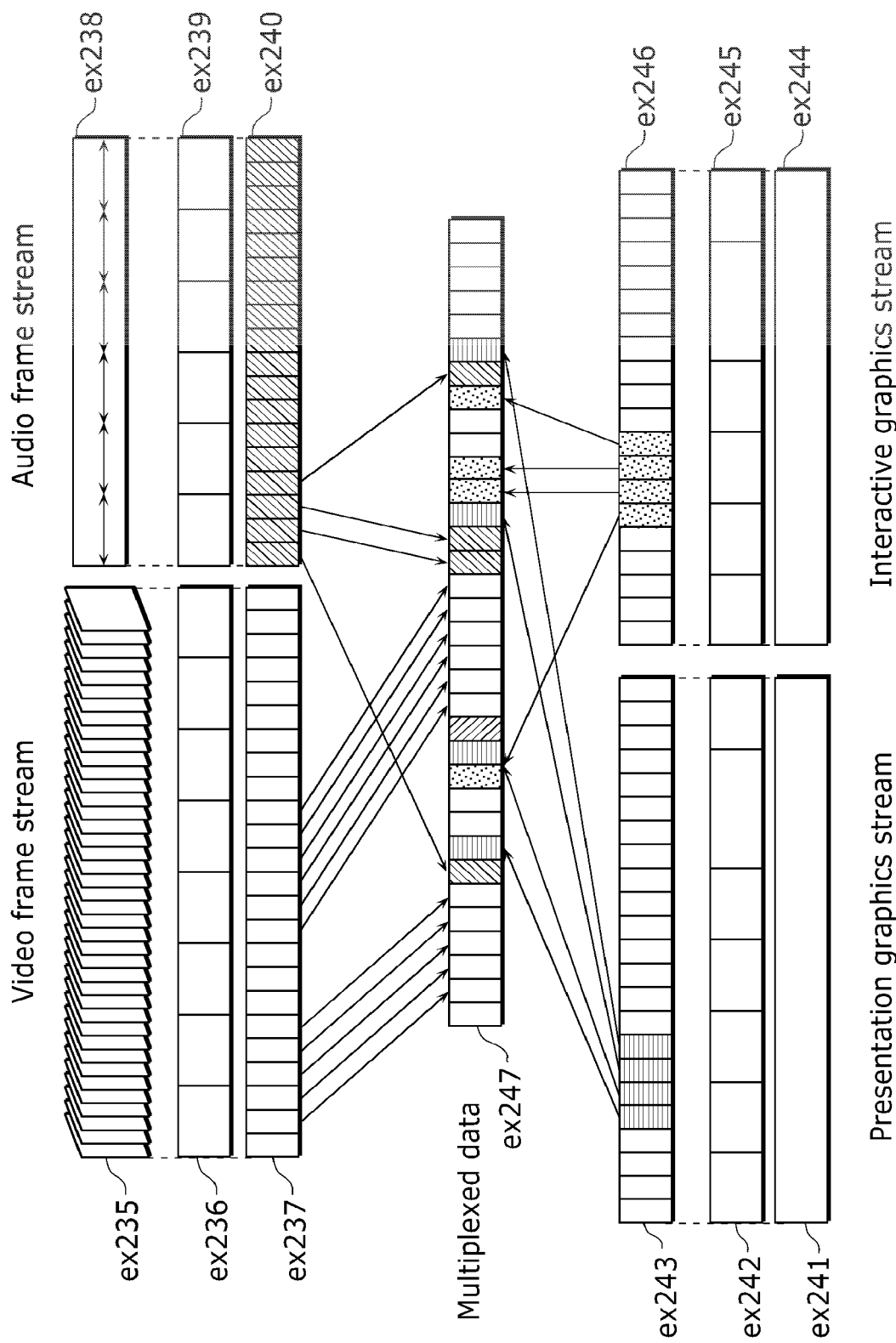
FIG. 25 schematically shows how each stream is multiplexed in multiplexed data.

FIG. 25 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 26:
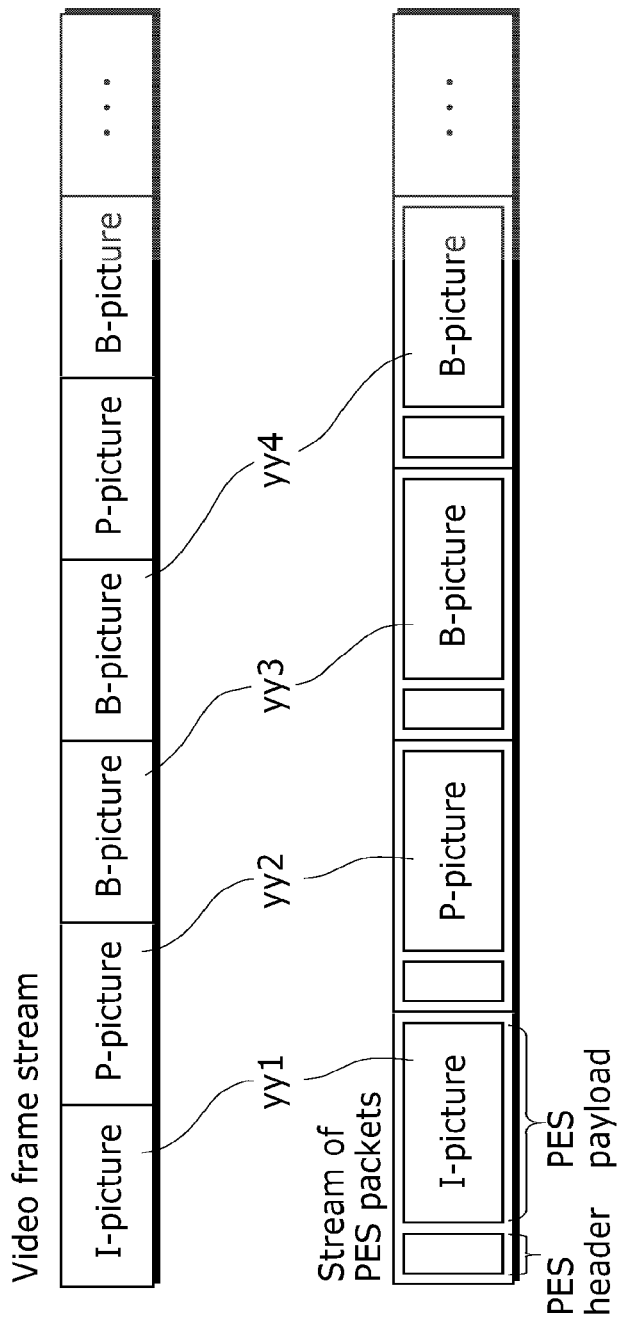
FIG. 26 shows how a video stream is stored in a stream of PES packets in more detail.

FIG. 26 illustrates how a video stream is stored in a stream of PES packets in more detail. The first bar in FIG. 26 shows a video frame stream in a video stream. The second bar shows the stream of PES packets. As indicated by arrows denoted as yy1, yy2, yy3, and yy4 in FIG. 26, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 27 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 27. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 28:
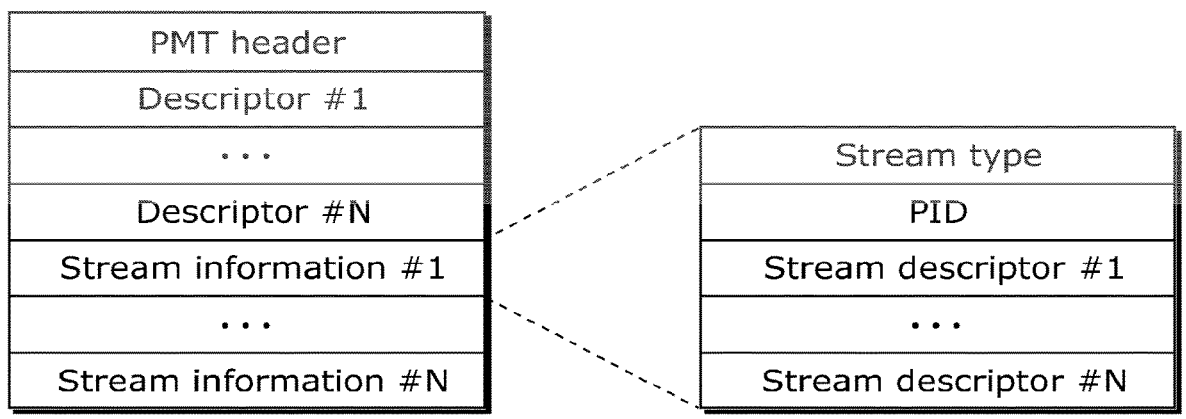
FIG. 28 shows a data structure of a PMT.

FIG. 28 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 29:
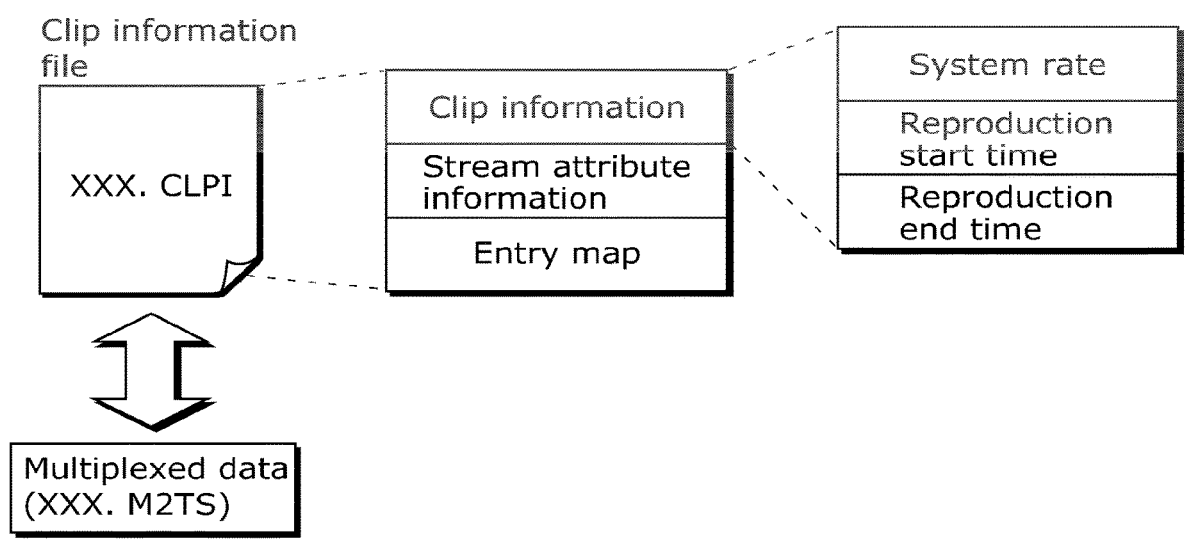
FIG. 29 shows an internal structure of multiplexed data information.

Each of the multiplexed data information files is management information of the multiplexed data as shown in FIG. 29. The multiplexed data information files are in one to one correspondence with the multiplexed data, and each of the files includes multiplexed data information, stream attribute information, and an entry map.

As illustrated in FIG. 29, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 30:
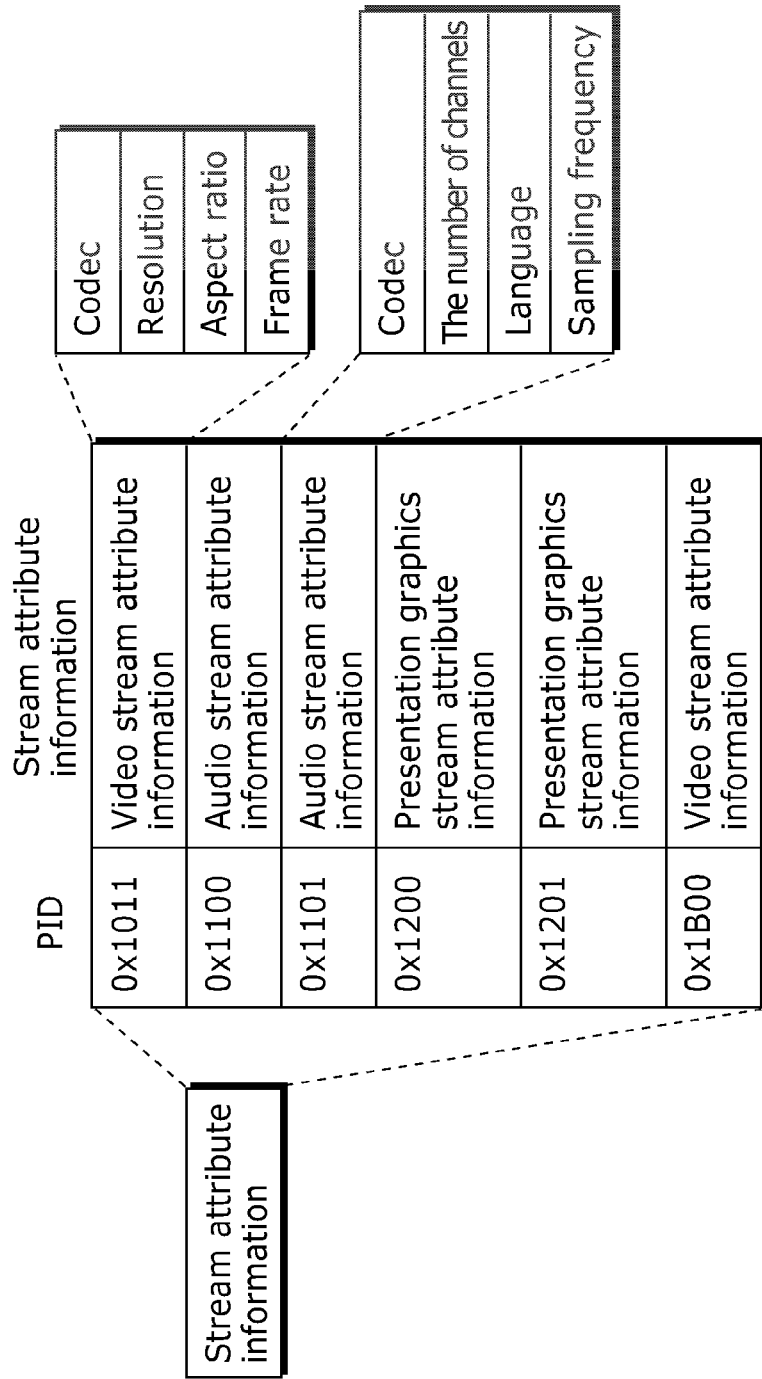
FIG. 30 shows an internal structure of stream attribute information.

As shown in FIG. 30, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 31:
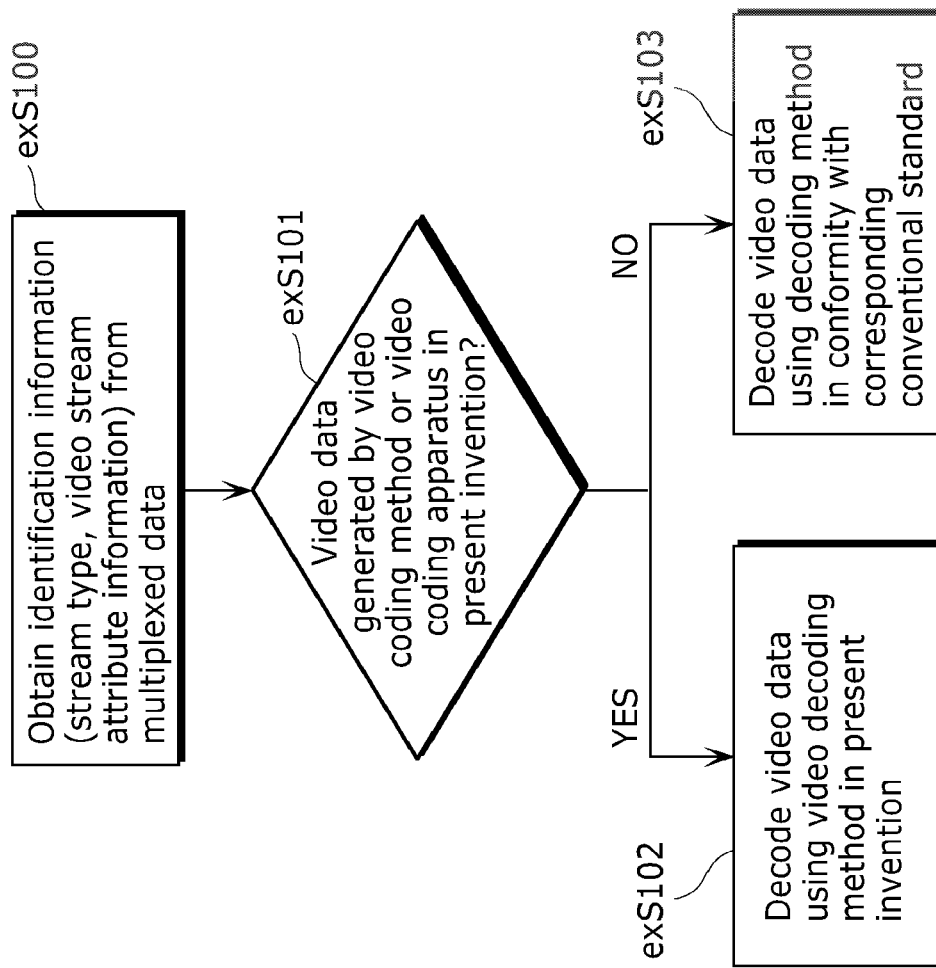
FIG. 31 shows steps for identifying video data.

Furthermore, FIG. 31 illustrates steps of the moving picture decoding method according to the present embodiment. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 6

Figure 32:
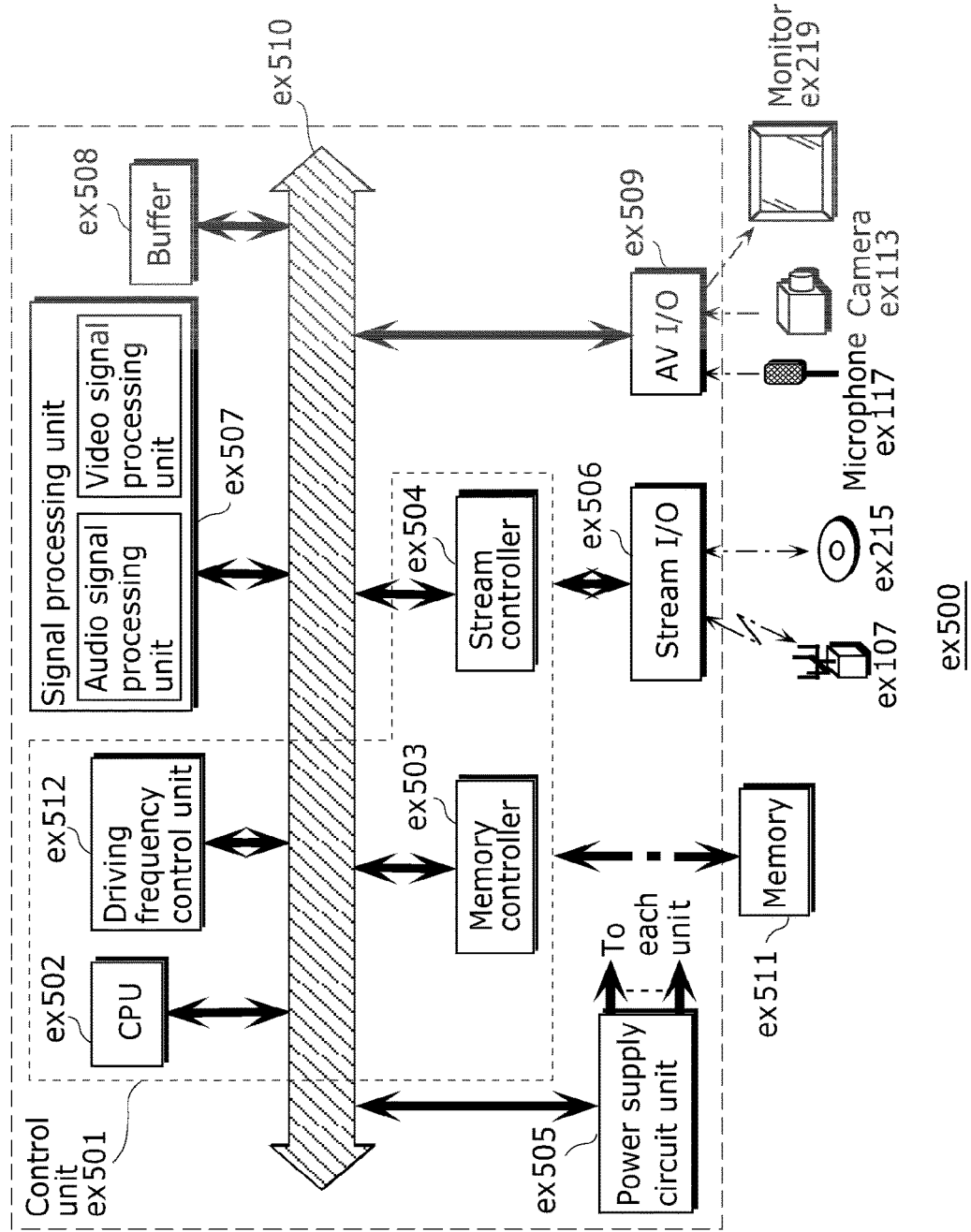
FIG. 32 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 32 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the inventive concept is applied to biotechnology.

Embodiment 7

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 33:
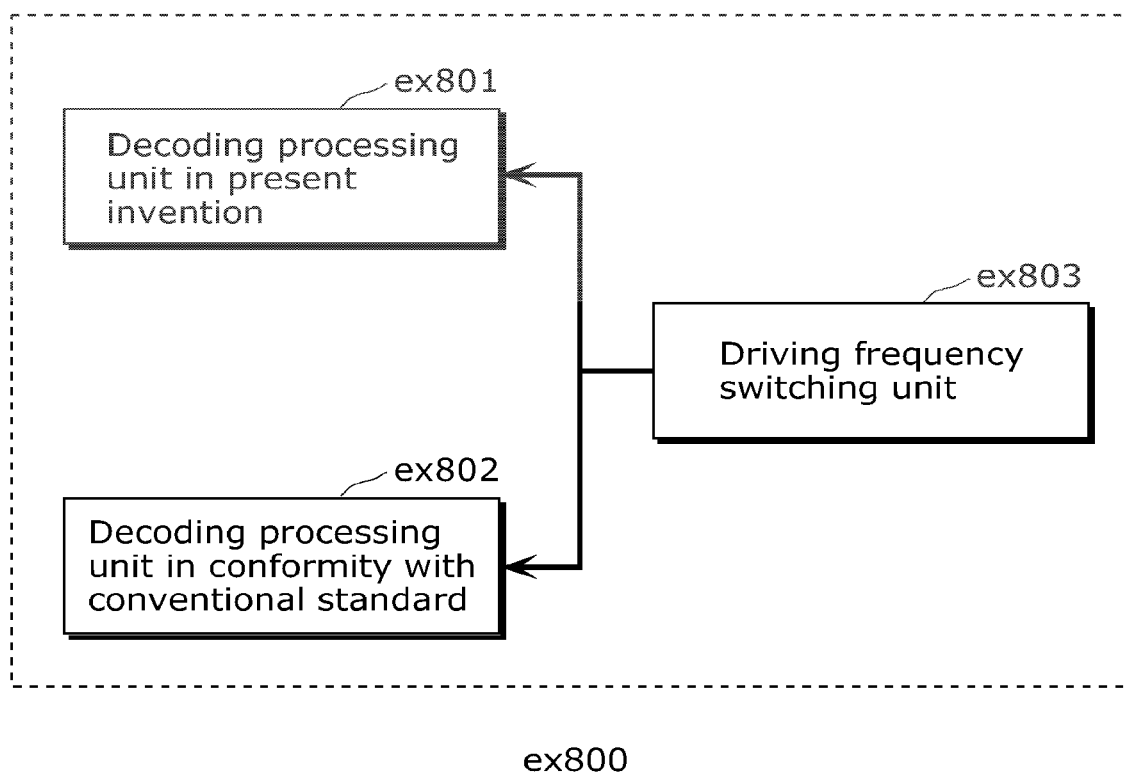
FIG. 33 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 33 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 32. Here, each of the decoding processing unit ex801 that executes the moving picture decoding method described in each of embodiments and the decoding processing unit ex802 that conforms to the conventional standard corresponds to the signal processing unit ex507 in FIG. 32. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 35. The driving frequency can be selected by storing the look-up table in the buffer ex508 and in an internal memory of an LSI, and with reference to the look-up table by the CPU ex502.

Figure 34:
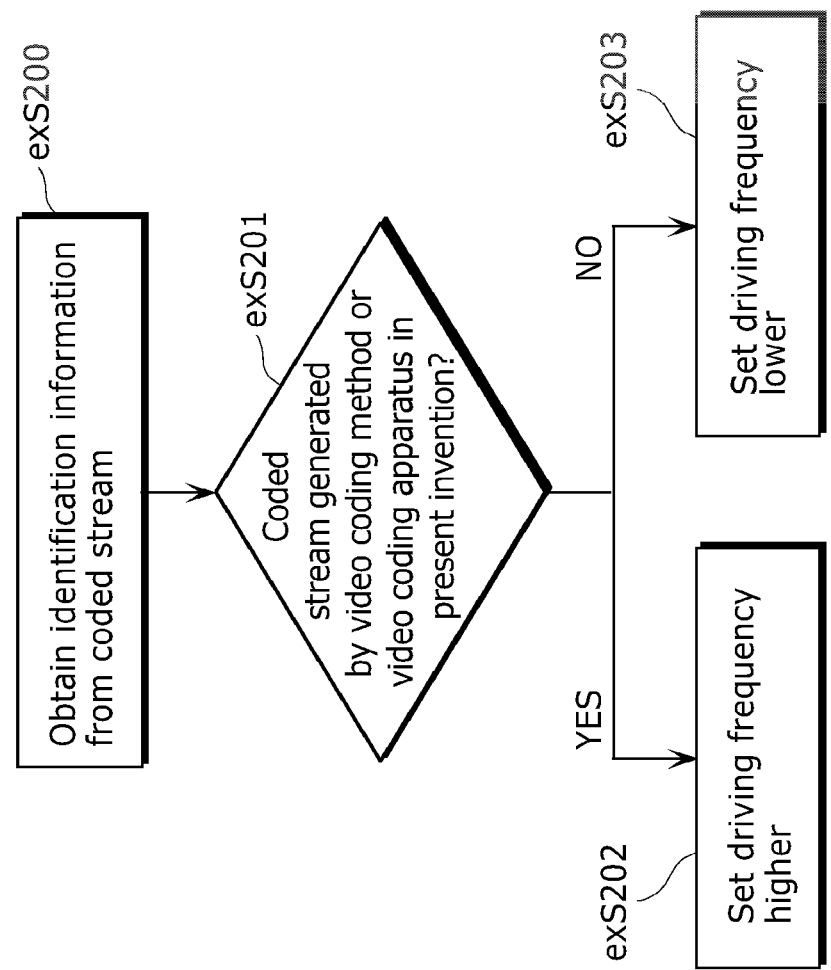
FIG. 34 shows steps for identifying video data and switching between driving frequencies.

FIG. 34 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 36A:
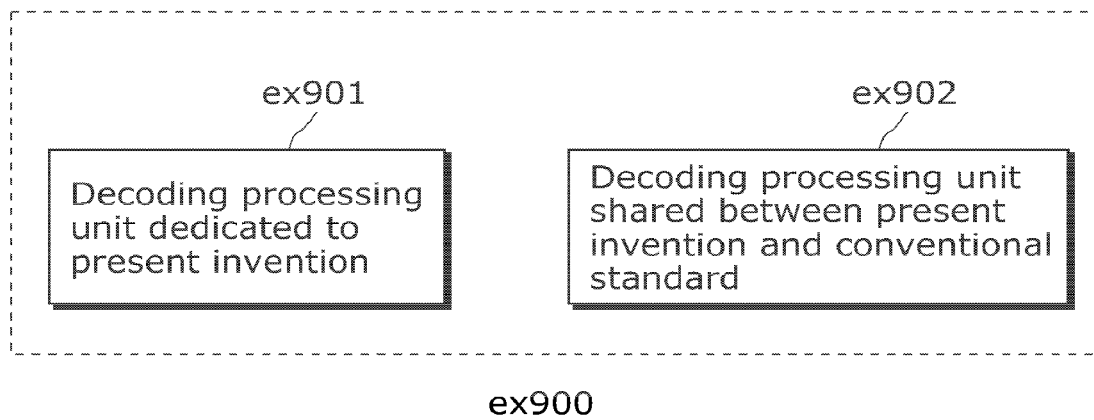
FIG. 36A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 36A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by entropy decoding in particular, for example, the dedicated decoding processing unit ex901 is used for entropy decoding. Otherwise, the decoding processing unit is probably shared for one of inverse quantization, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 36B:
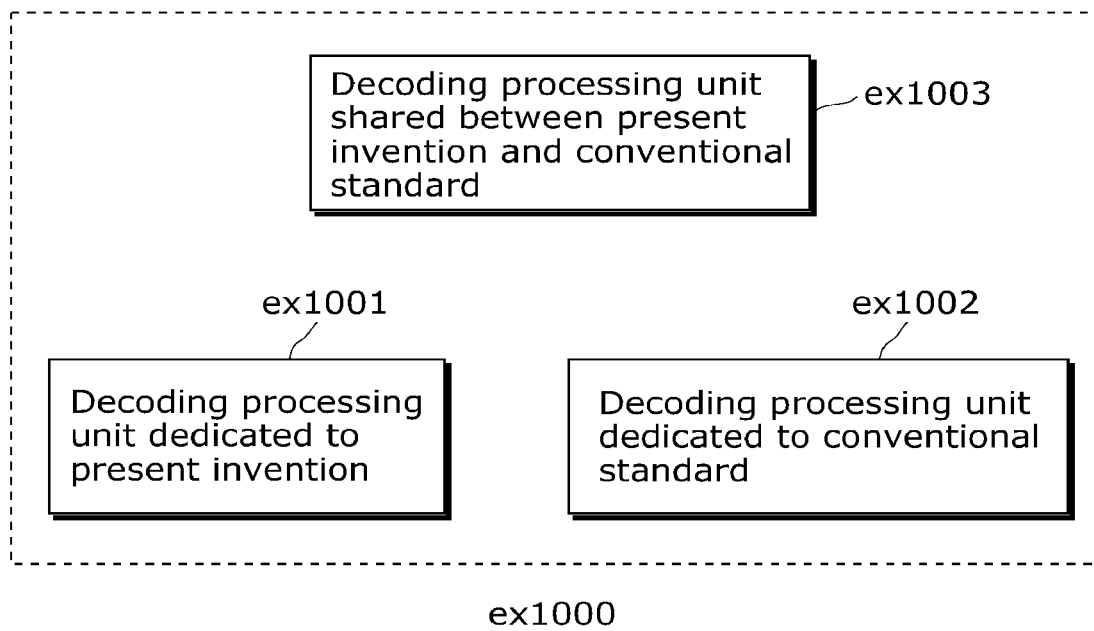
FIG. 36B is a diagram showing another example of a configuration for sharing a module of the signal processing unit.

Furthermore, ex1000 in FIG. 36B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The image coding method and the image decoding method according to an aspect of the present disclosure is applicable to, for example, television receivers, digital video recorders, car navigation systems, cellular phones, digital cameras, and digital video cameras.

What is claimed is:

1. A method for decoding, from a bitstream, a difference motion vector which indicates a difference between a motion vector used to predict a picture and a predicted motion vector that is a prediction of the motion vector, the method comprising:
  decoding, from the bitstream, a code string, wherein the code string indicates whether or not a horizontal component of the difference motion vector and a vertical component of the difference motion vector are 0;
  in response to determining that the code string indicates that the horizontal component of the difference motion vector is not zero and that the vertical component of the difference motion vector is not zero:
    decoding, from the bitstream, first grouped data that includes (i) first prefix data that is a prefix portion of the horizontal component of the difference motion vector, and (ii) second prefix data that is a prefix portion of the vertical component of the difference motion vector;
    decoding, from the bitstream, subsequent to decoding the first grouped data, second grouped data that includes (i) first suffix data that is a suffix portion of the horizontal component of the difference motion vector, and (ii) second suffix data that is a suffix portion of the vertical component of the difference motion vector;
    deriving the horizontal component of the difference motion vector from a combination of the first prefix data and the first suffix data; and
    deriving the vertical component of the difference motion vector from a combination of the second prefix data and the second suffix data.

2. The method of claim 1 wherein decoding the code string comprises performing context adaptive binary arithmetic decoding with variable probability.

3. The method of claim 1 wherein decoding the first grouped data comprises performing context adaptive binary arithmetic decoding with variable probability.

4. The method of claim 1 wherein decoding the second grouped data comprises performing bypass decoding.

5. An apparatus which decodes, from a bitstream, a difference motion vector which indicates a difference between a motion vector used to predict a picture and a predicted motion vector that is a prediction of the motion vector, the apparatus comprising:
  processing circuitry; and
  storage accessible from the processing circuitry, the storage having instructions which when executed by the processing circuitry cause the apparatus to:
  decode, from the bitstream, a code string, wherein the code string indicates whether or not a horizontal component of the difference motion vector and a vertical component of the difference motion vector are 0;
  in response to determining that the code string indicates that the horizontal component of the difference motion vector is not zero and that the vertical component of the difference motion vector is not zero:
    decode, from the bitstream subsequent to decoding the code string, first grouped data that includes (i) a first prefix data that is a prefix portion of the horizontal component of the difference motion vector, (ii) a second prefix data that is a prefix portion of the vertical component of the difference motion vector;
    decode, from the bitstream, subsequent to decoding the first grouped data, second grouped data that includes (i) the first suffix data that is a suffix portion of the horizontal component of the difference motion vector, and (ii) the second suffix data that is a suffix portion of the vertical component of the difference motion vector;
    derive the horizontal component of the difference motion vector from a combination of the first prefix data and the first suffix data; and
    derive the vertical component of the difference motion vector from a combination of the second prefix data and the second suffix data.

6. The apparatus of claim 5 wherein decoding the code string comprises performing context adaptive binary arithmetic decoding with variable probability.

7. The apparatus of claim 5 wherein decoding the first grouped data comprises performing context adaptive binary arithmetic decoding with variable probability.

8. The apparatus of claim 5 wherein decoding the second grouped data comprises performing bypass decoding.

9. A method for encoding, into a bitstream, a difference motion vector which indicates a difference between a motion vector used to predict a picture and a predicted motion vector that is a prediction of the motion vector, the method comprising:
  encoding, into the bitstream, a code string, wherein the code string indicates whether or not a horizontal component of the difference motion vector and a vertical component of the motion vector difference are 0;
  when the encoded code string indicates that the horizontal component of the difference motion vector is not zero and that the vertical component of the difference motion vector is not zero:
    encoding, into the bitstream, first grouped data that includes (i) first prefix data that is a prefix portion of the horizontal component of the difference motion vector, and (ii) second prefix data that is a prefix portion of the vertical component of the difference motion vector; and
    encoding, into the bitstream, subsequent to encoding the first grouped data, second grouped data that includes (i) first suffix data that is a suffix portion of the horizontal component of the difference motion vector, and (ii) second suffix data that is a suffix portion of the vertical component of the difference motion vector.

10. The method of claim 9 wherein encoding the code string comprises performing context adaptive binary arithmetic coding with variable probability.

11. The method of claim 9 wherein encoding the first grouped data comprises performing context adaptive binary arithmetic coding with variable probability.

12. The method of claim 9 wherein encoding the second grouped data comprises performing bypass coding.

13. An apparatus which encodes, into a bitstream, a difference motion vector which indicates a difference between a motion vector used to predict a picture and a predicted motion vector that is a prediction of the motion vector, the apparatus comprising:
processing circuitry; and
storage accessible from the processing circuitry, the storage having instructions which when executed by the processing circuitry cause the apparatus to:
encode, into the bitstream, a code string, wherein the code string indicates whether or not a horizontal component of the difference motion vector and a vertical component of the difference motion vector are 0;
when the encoded code string indicates that the horizontal component of the difference motion vector is not zero and that the vertical component of the difference motion vector is not zero:
encode, into the bitstream, first grouped data that includes (i) a first prefix data that is a prefix portion of the horizontal component of the difference motion vector, and (ii) a second prefix data that is a prefix portion of the vertical component of the difference motion vector; and
encode, into the bitstream, subsequent to encoding the first grouped data, second grouped data that includes (i) the first suffix data that is a suffix portion of the horizontal component of the difference motion vector, and (ii) the second suffix data that is a suffix portion of the vertical component of the difference motion vector.

14. The apparatus of claim 13 wherein encoding the code string comprises performing context adaptive binary arithmetic coding with variable probability.

15. The apparatus of claim 13 wherein encoding the first grouped data comprises performing context adaptive binary arithmetic coding with variable probability.

16. The apparatus of claim 13 wherein encoding the second grouped data comprises performing bypass coding.

* * * * *